INVENTOR
WILLIAM R. UTTAL
BY Alvin J. Riddles
ATTORNEY

Feb. 25, 1964 W. R. UTTAL 3,121,959

EDUCATIONAL DEVICE

Filed Dec. 12, 1960 14 Sheets-Sheet 2

Feb. 25, 1964 W. R. UTTAL 3,121,959

EDUCATIONAL DEVICE

Filed Dec. 12, 1960 14 Sheets-Sheet 4

Feb. 25, 1964 W. R. UTTAL 3,121,959
EDUCATIONAL DEVICE
Filed Dec. 12, 1960 14 Sheets-Sheet 5
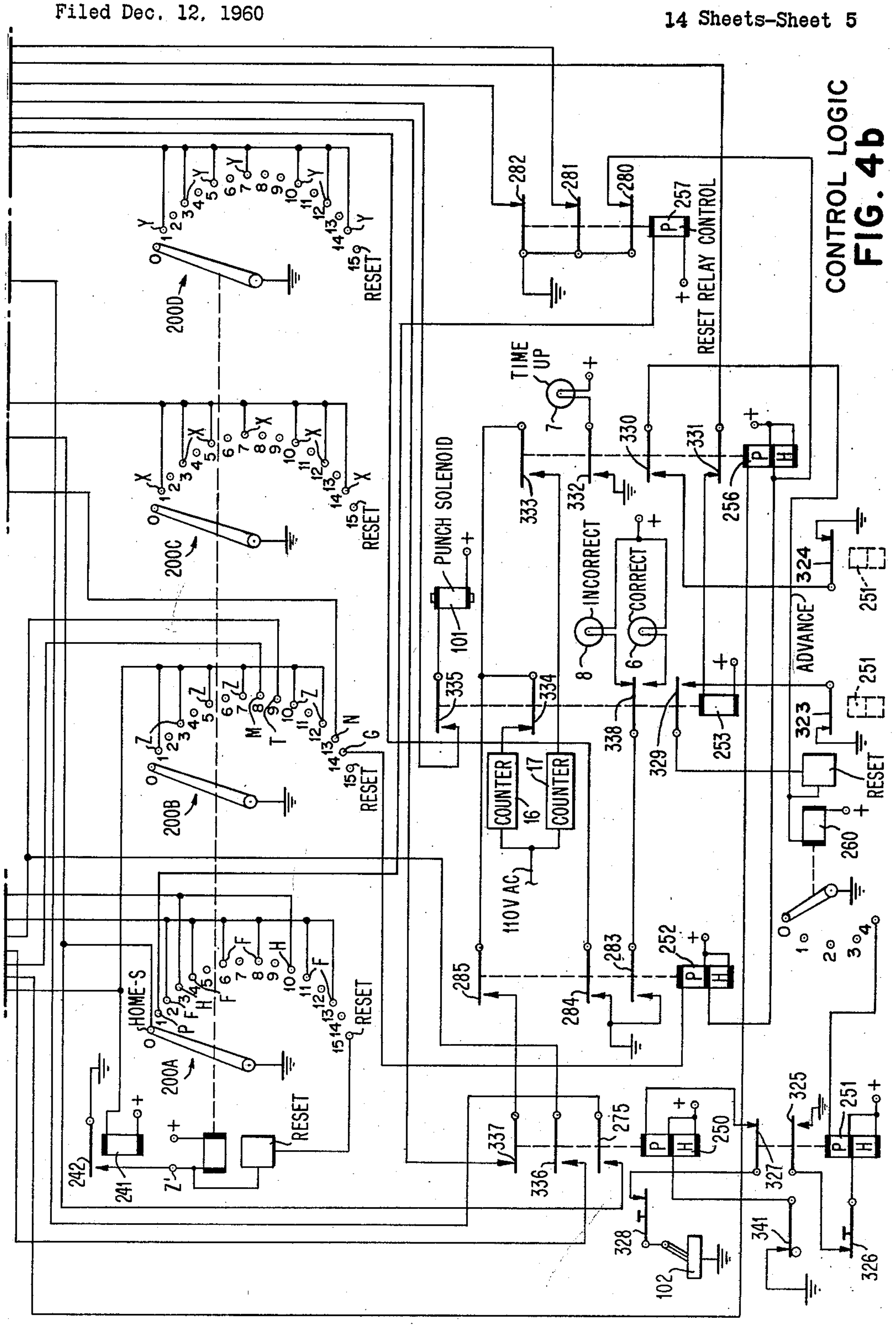
CONTROL LOGIC FIG. 4b Feb. 25, 1964 W. R. UTTAL 3,121,959

EDUCATIONAL DEVICE

Filed Dec. 12, 1960 14 Sheets-Sheet 6

Feb. 25, 1964 W. R. UTTAL 3,121,959

EDUCATIONAL DEVICE

Filed Dec. 12, 1960 14 Sheets-Sheet 9

Feb. 25, 1964 W. R. UTTAL 3,121,959

EDUCATIONAL DEVICE

Filed Dec. 12, 1960 14 Sheets-Sheet 13

Feb. 25, 1964 W. R. UTTAL 3,121,959

EDUCATIONAL DEVICE

Filed Dec. 12, 1960 14 Sheets-Sheet 14

United States Patent Office
3,121,959
Patented Feb. 25, 1964

3,121,959

EDUCATIONAL DEVICE

William R. Uttal, Yorktown Heights, N.Y., assignor to International Business Machines Corporation, New York, N.Y., a corporation of New York Filed Dec. 12, 1960, Ser. No. 75,373
19 Claims. (Cl. 35—9)

This invention relates to mechanical aids to the communication of mental concepts; and, in particular, to the branch of the art known as "Educational Devices" or "Teaching Machines."

The art of mechanical aids to teaching was developed primarily to assist classroom instructors by reducing the repetitive operations involved in the presentation of material. These mechanical aids were pioneered by educators in order to make more efficient use of the classroom instructor's time. Recently in the art, the surprising effectiveness of these devices has been recognized by others and their use has been applied in such fields as the teaching of job operations to persons in technologies where the educational background of the individual is not commensurate with the complexity of the technology.

The science of communication of mental concepts from one person to another, such as from an instructor to a student, as far as the art has developed to date, indicates that the reception and understanding by the student of the mental concept; in other words, learning, is made up of two basic types, the first of which is "rote" which may be said to involve pure memory with minimum logic and then, building upon the concept acquired through rote learning, a more advanced type becomes involved which may be called "logical reasoning."

In the development of the science of communication of mental concepts, a number of principles have evolved as elements influencing the rate of progress of learning. As background in the art, the following references may be of assistance: The Psychology of Human Learning, by McGeoch and Irion and The Science of Learning and the Art of Teaching, by B. F. Skinner, Harvard Educational Review, vol. 24, 1954, pages 86–97. The principles evolved to date are recognized in the art slowly since they are primarily products of experience in social science; and, as further expereince in these sciences is gained, it is conceivable that more principles will become apparent. The application of these principles of learning is accomplished in mechanical aids to education by a combination of the use of a medium which is referred to in the art as a program and an arrangement of input and output devices. In the program, the subject matter being presented is arranged in incremental steps capable of assimilation by the student. Generally, these steps constitute, in the early stages, purely rote learning of a number of facts, and then, as foundations are laid, facts deducible from combinations of earlier presented facts are considered. Thus, the mechanical aid or teaching machine operates to serve as the input-output device for the program.

It has been recognized in the development of this art that the program is the key to the effectiveness of the entire learning process and that the organization of the program will be governed by the capabilities of the mechanical input-output equipment. It is thus apparent that a truly effective educational device will embody maximum flexibility to use the various means of communication between the instructor and the student.

The majority of mechanical aids to teaching, thus far appearing in the art, have been directed purely to the straight forward sequential presentation of the programmed material. Such structures to date have been capable of employing only a few of the above described principles of learning.

In this discussion the term "mechanical" is descriptive of the instrumentality of the intercommunication between the parties rather than descriptive of the structure of the aiding device itself since most of these devices are combinations of mechanical and electrical structures.

It has been discovered that the effectiveness of the learning operation can be enhanced by a logical arrangement of apparatus capable of providing a greater depth of intercommunication between the instructor and the student and permitting greater control of the presented material governed by the responses and rate of reception of the student. With the logical arrangement of apparatus of the invention, an instructor may employ more diversified learning principles and may include in his presentation to the student through the medium of the program, greater use of these principles as they develop in the art. These features permit the educational process to progress through the rote learning stage and into the logical reasoning stage. The device of this invention permits the program to employ planned sequences involving skipping of the material upon successive completion of certain portions and the introduction of more difficult work as the rate of progress increases.

These features are accomplished in accordance with the invention through the provision of a memory element for the programmed material that is capable of both random and sequential access, a machine to operator communicating device for presenting the increments of the subject matter, an operator to machine input device through which a constructed answer is entered, a performance monitoring feature including an answer correctness evaluator and indicator, and a prompting feature controlled by a time element; and, a program presentation governor that is responsive to the rate of reception of the student. These components cooperate in the over-all educational device of this invention to permit the student to progress at his own rate, to have his rate of progress govern the difficulty, and the quantity of subject matter considered and to permit the instructor, who is ultimately the programmer, to employ in his programmed presentation the various rules of learning uncovered by the art as it develops.

A primary object of this invention is to provide a mental concept communicating device employing an improved range of the available media of intelligence exchange between the communicating parties.

Another object of this invention is to provide a mental concept communicating device wherein progress is governed by the rate of intelligence exchange between the communicating parties.

Another object of this invention is to provide a mental concept communicating device wherein informational material is presented under the control of rate of reception and time of response, which controls are in turn governed by a constructed response to the material presented.

Another object of this invention is to provide an improved educational device wherein the subject matter is presented in increments in an order governed by correctness of constructed responses and time.

Another object of this invention is to provide an improved teaching machine wherein the subject matter is presented in increments via one of the senses in an order governed by correctness of an actually constructed response and time.

Another object of this invention is to provide an improved teaching machine capable of modifying its order of presentation in accordance with student reception.

Another object of this invention is to provide an improved teaching machine capable of prompting the student.

Another object of this invention is to provide an improved teaching machine capable of evaluating student progress on the basis of correctness of response and frequency of excessive time for response.

Another object of this invention is to provide an improved educational device capable of modifying its order of presentation of information on the basis of correctness of response and frequency of excessive time for response.

The foregoing and other objects, features and advantages of the invention will be apparent from the following more particular description of a preferred embodiment of the invention, as illustrated in the accompanying drawings.

FIGS. 4*a* to 4*j* represent a schematic wiring diagram of the educational apparatus illustrating the principles of the invention.

Figure 4A:
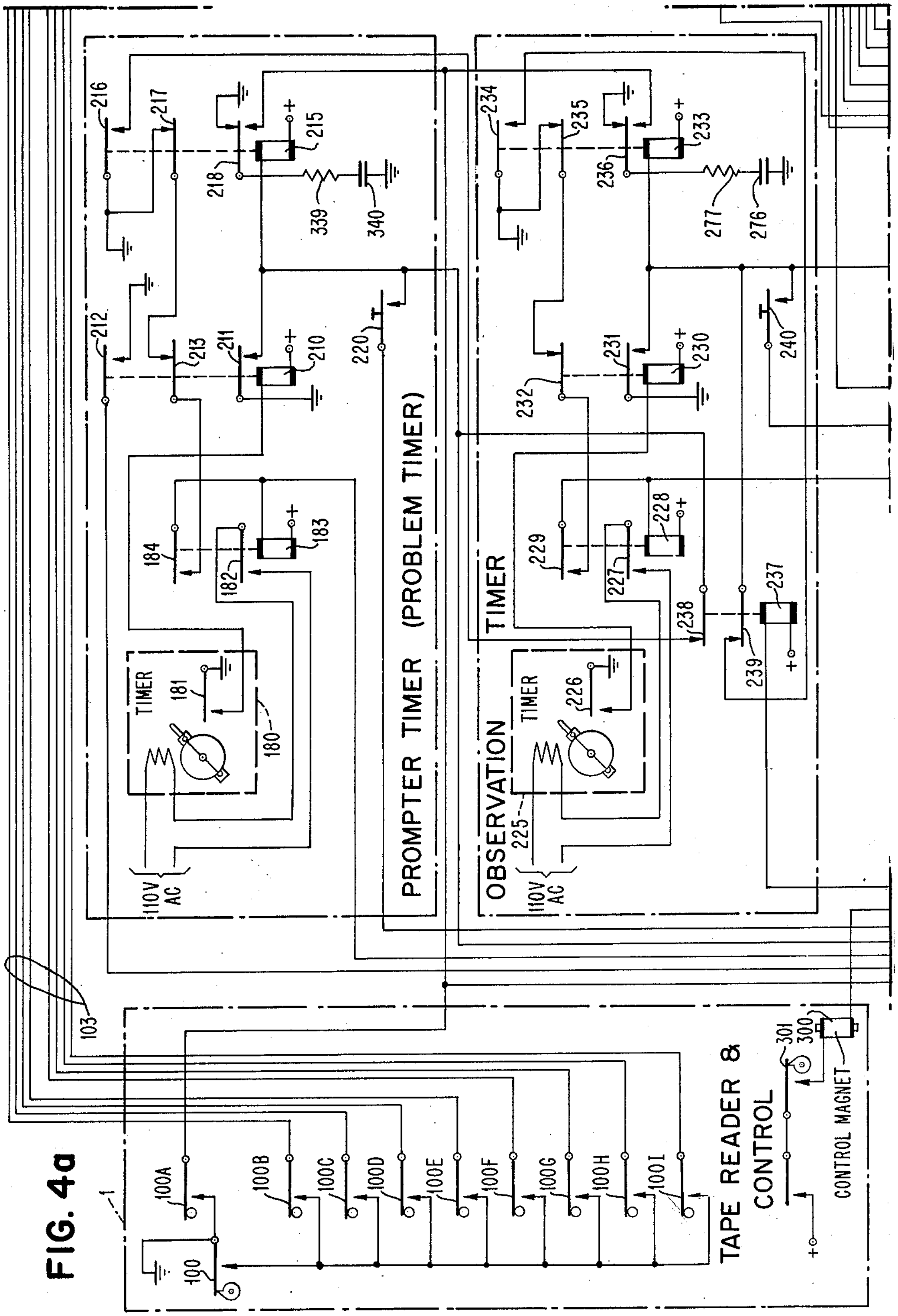
Figure 4C:
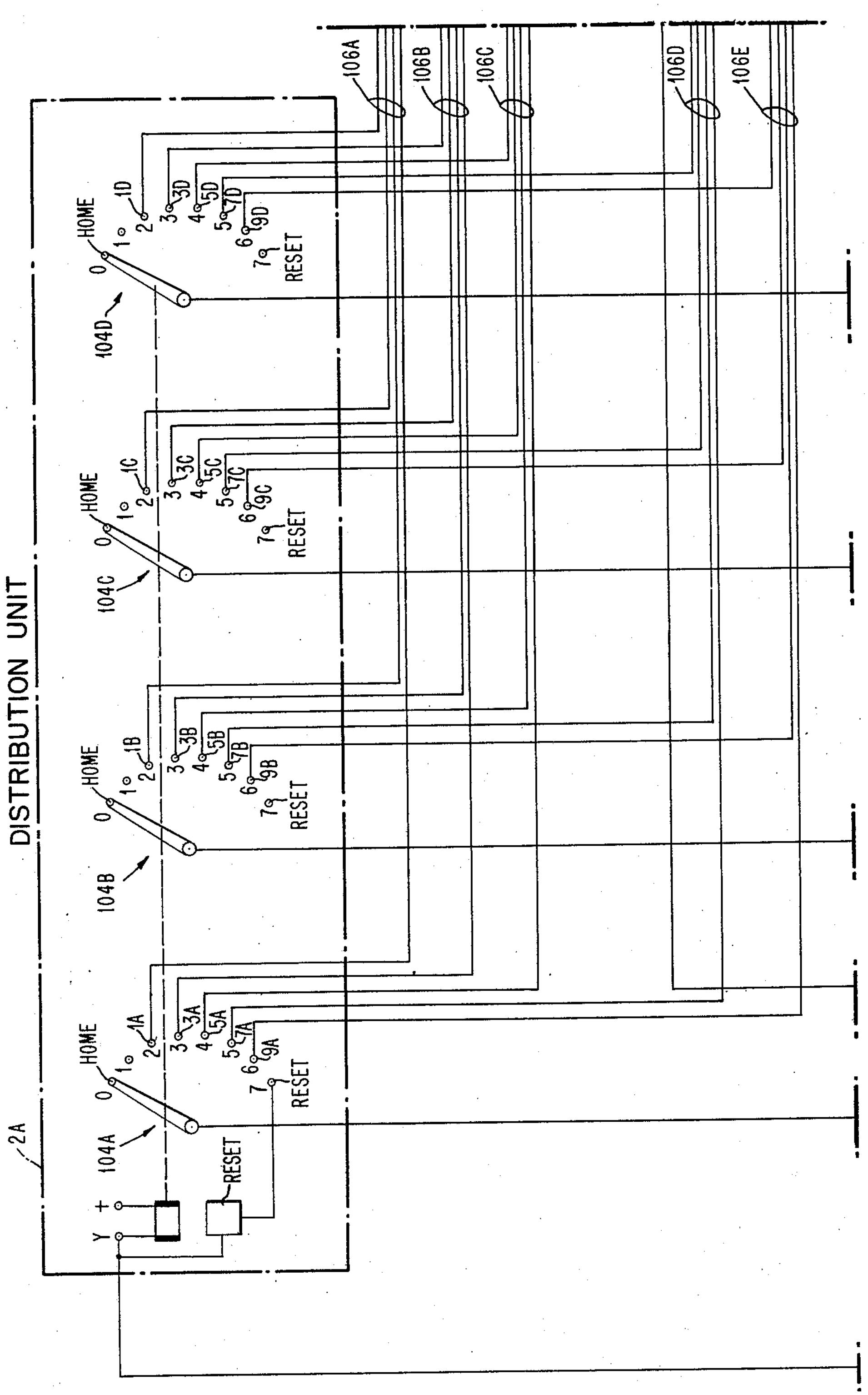
Figure 4D:
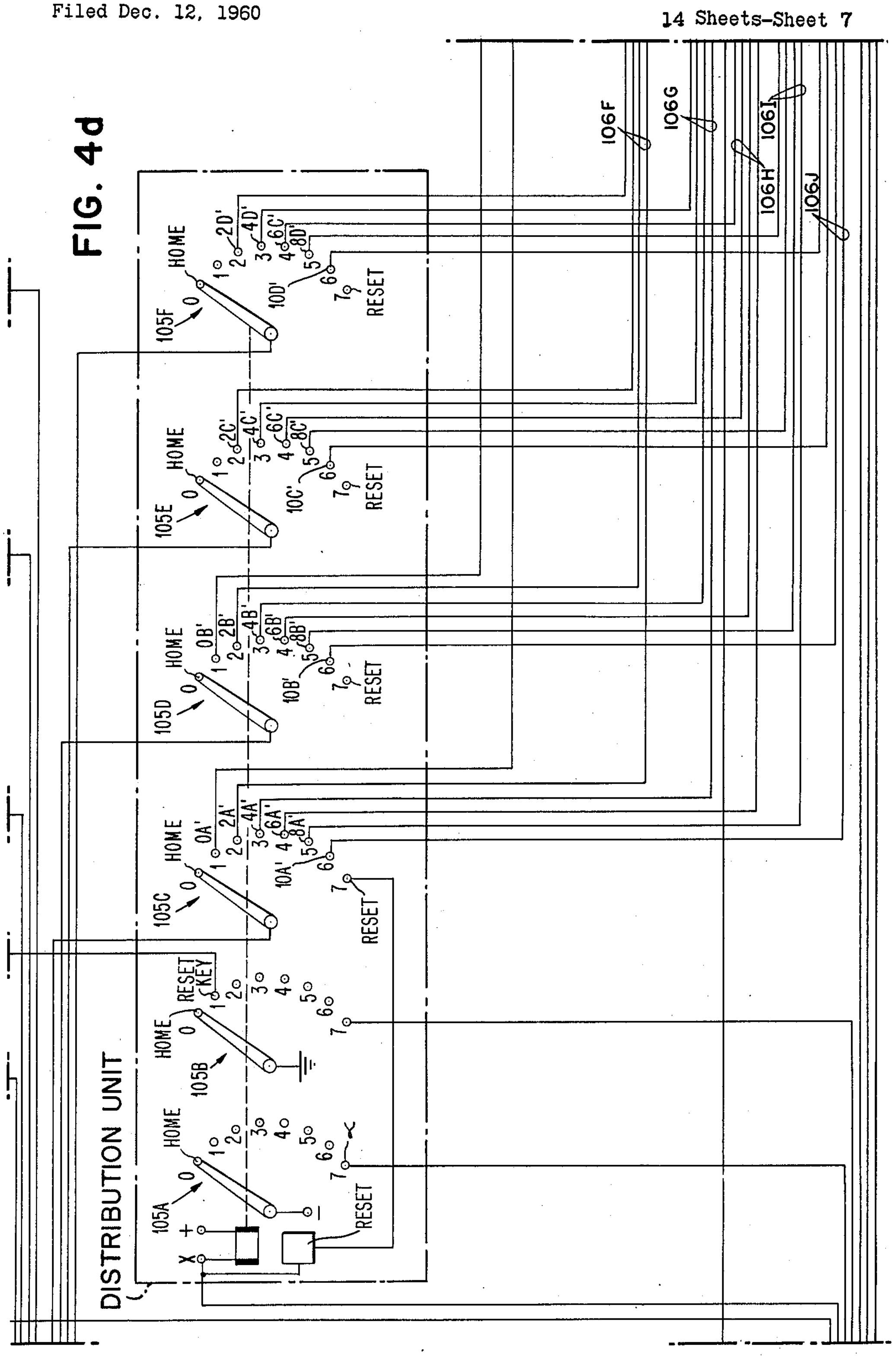
Figure 4E:
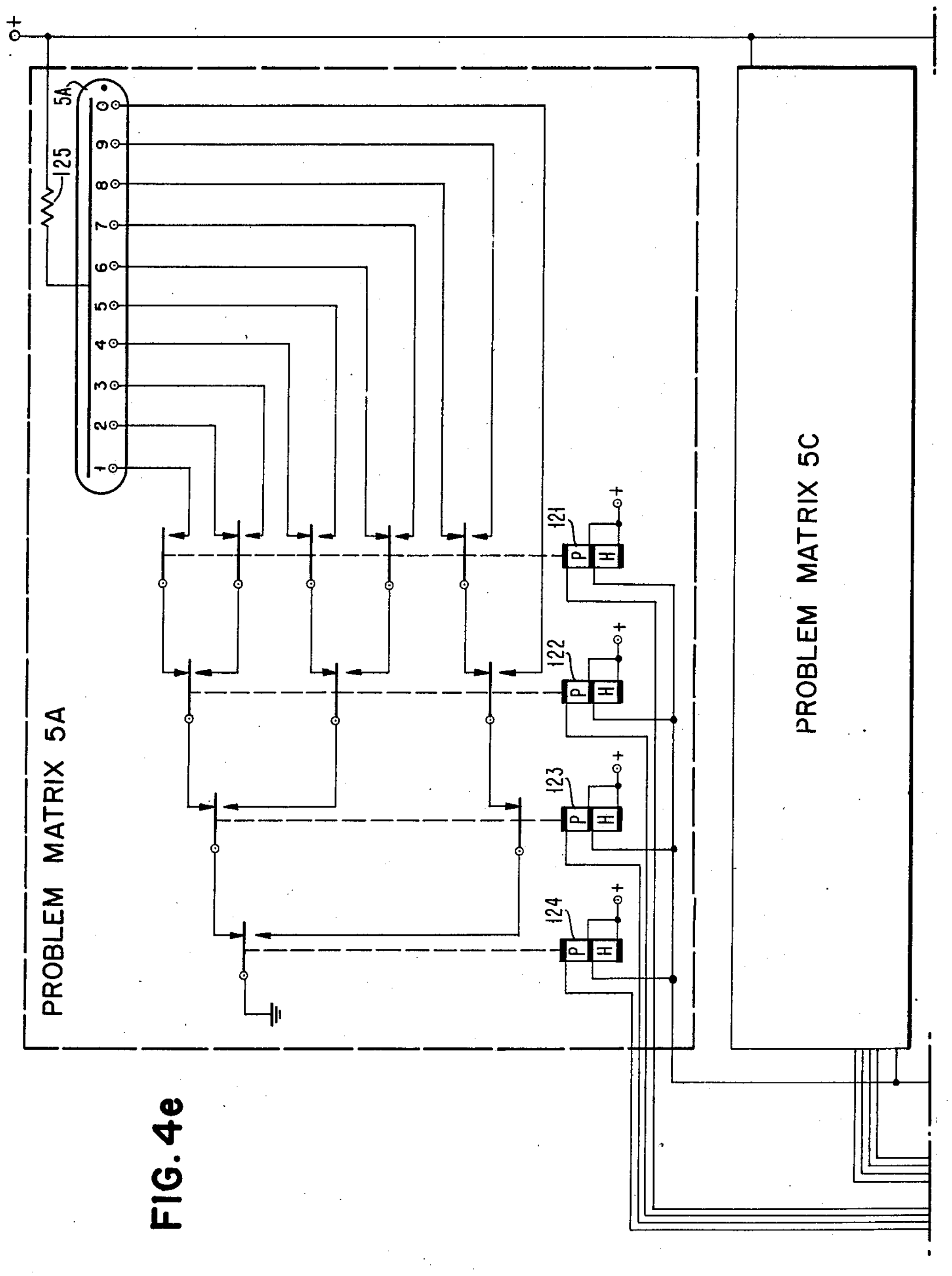
Figure 4F:
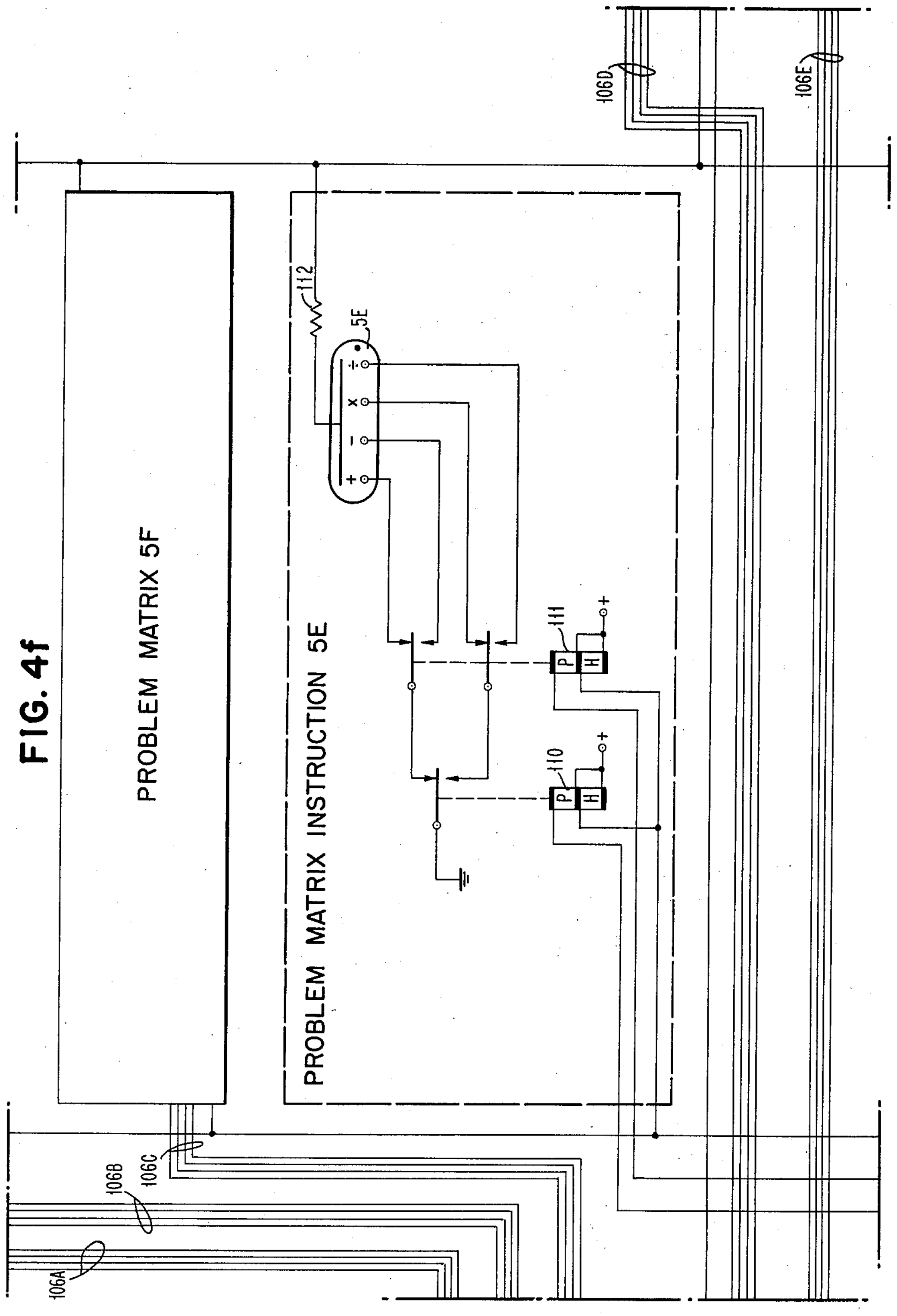
Figure 4G:
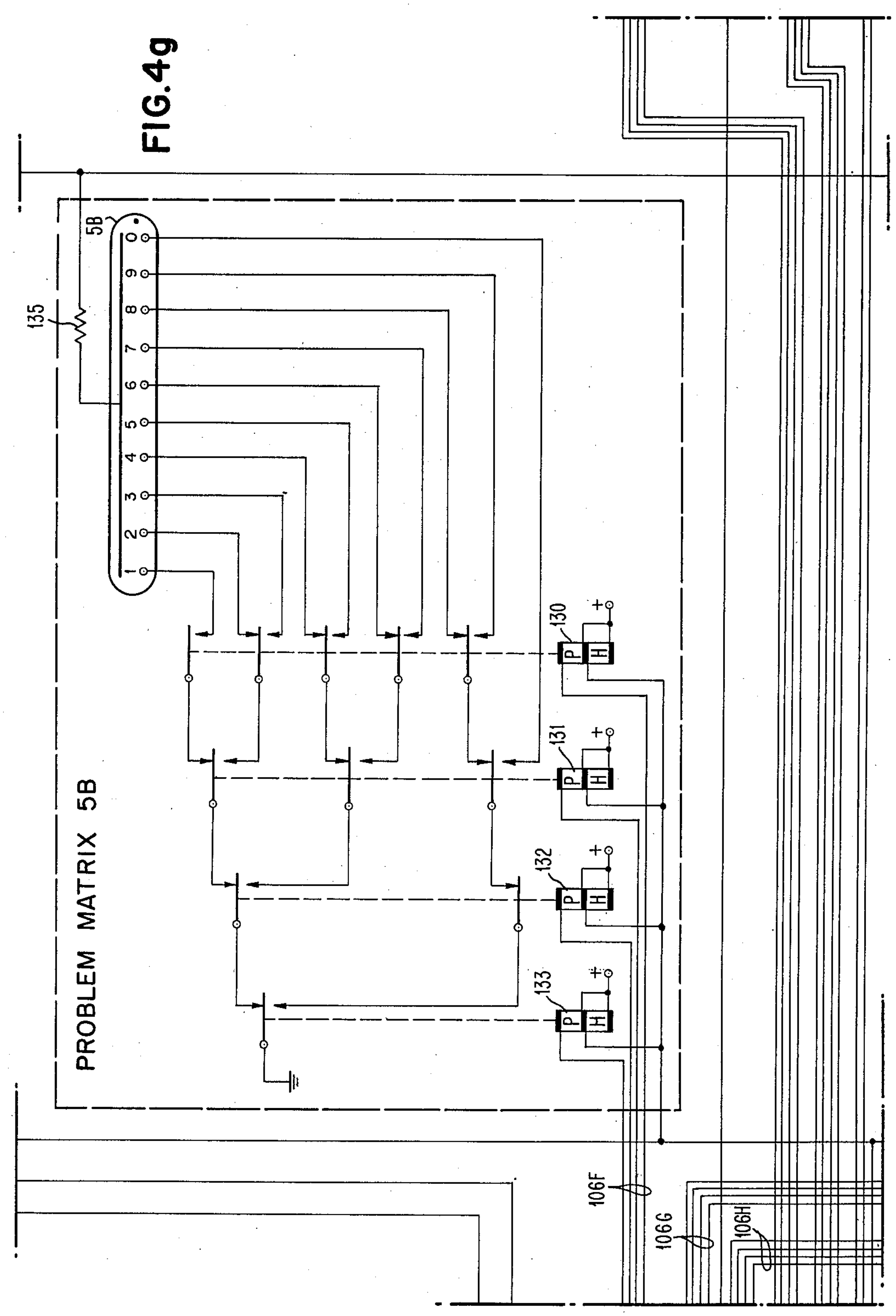
Figure 4I:
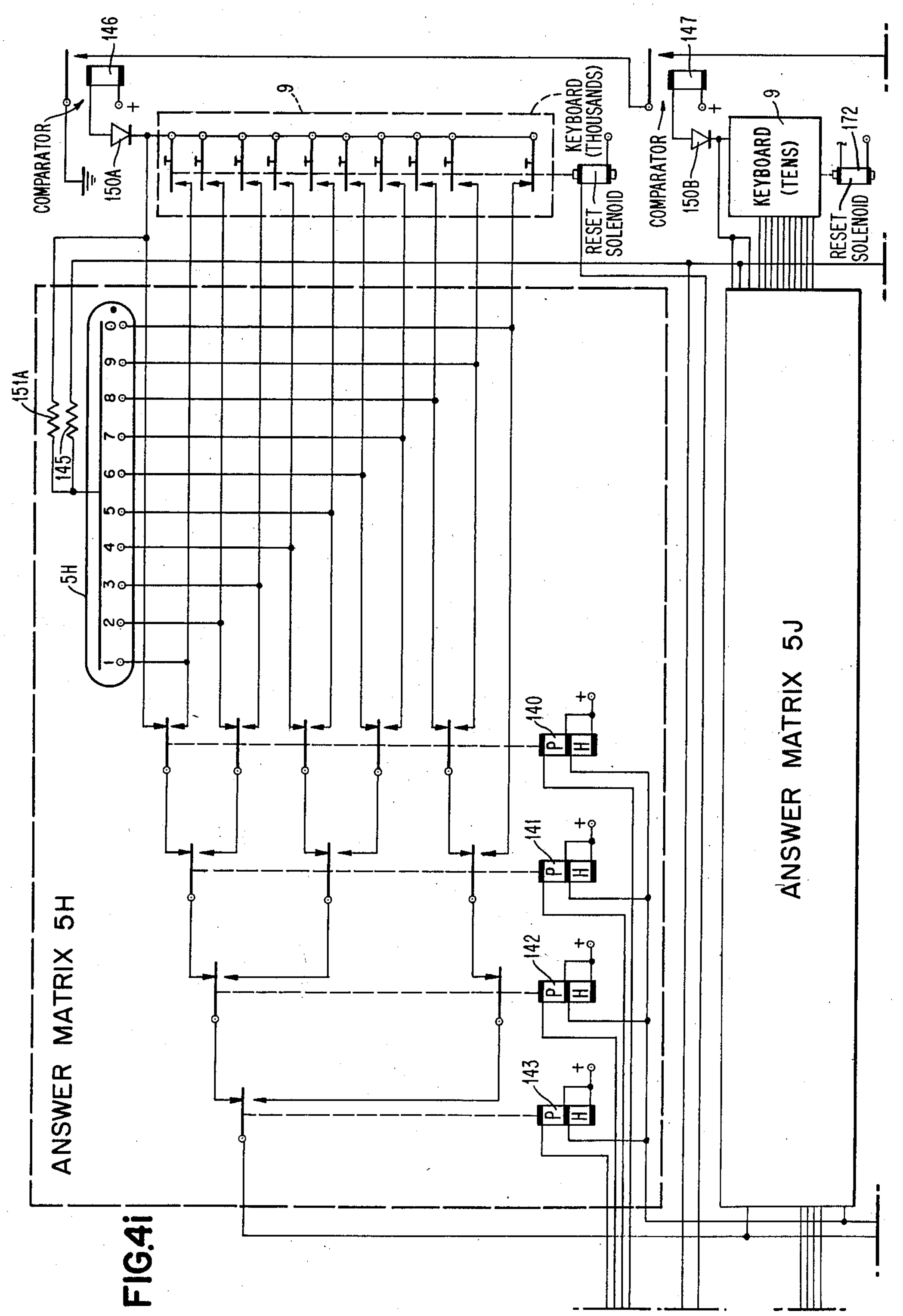
Figure 4J:
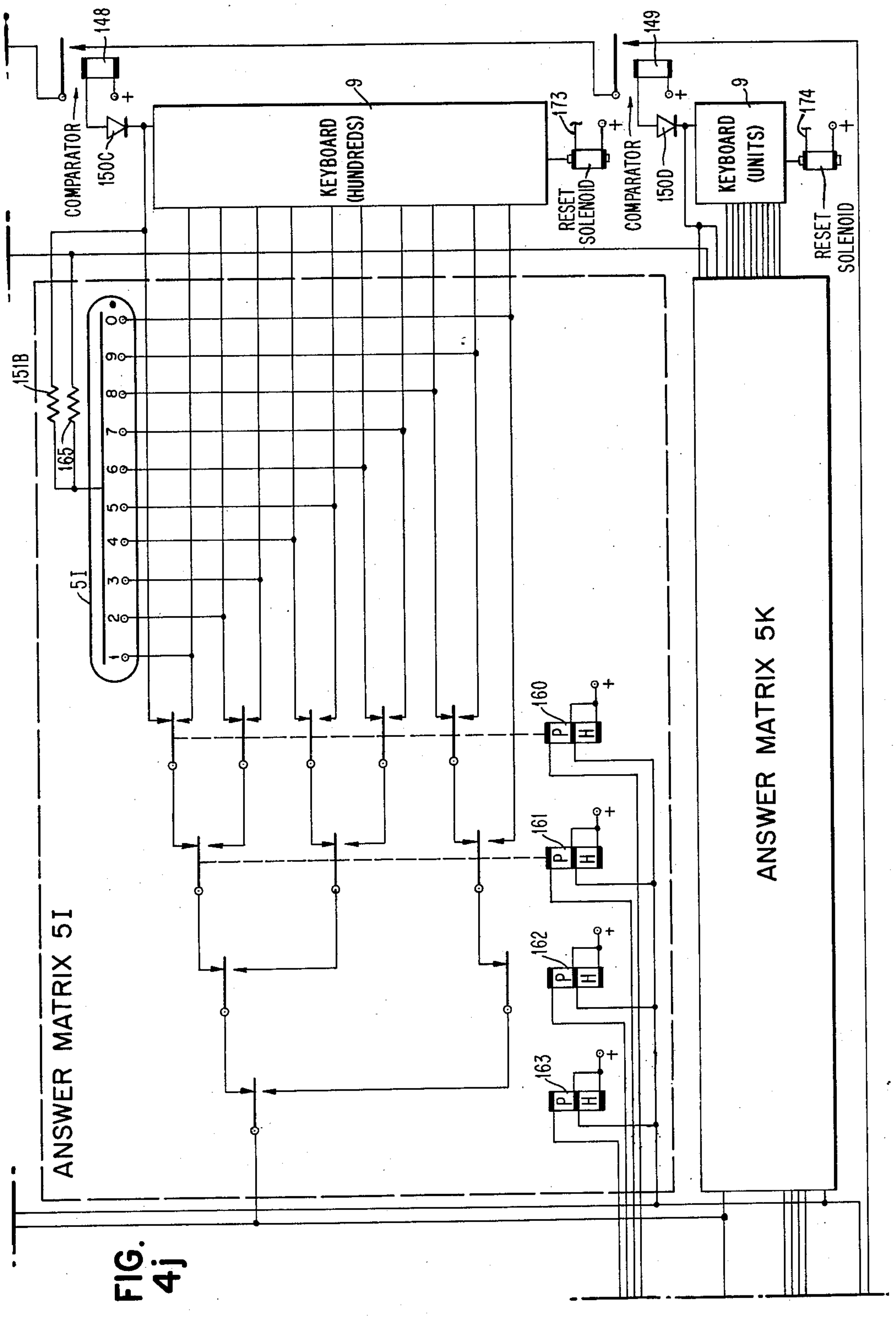
Figure 5:
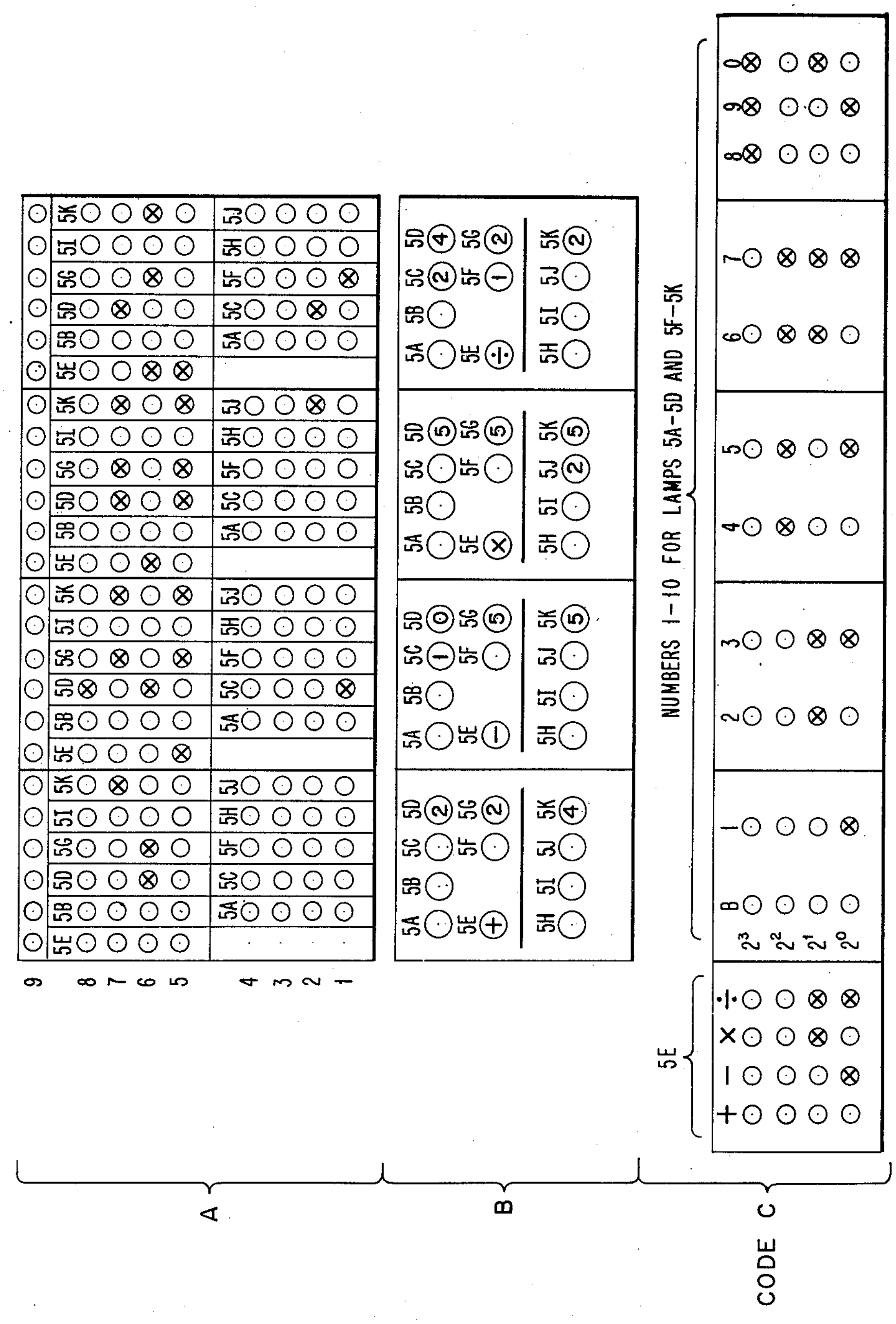

FIG. 5 is a layout of the memory tape employed in the device shown in FIGS. 4*a* to 4*j*.

Figure 6:
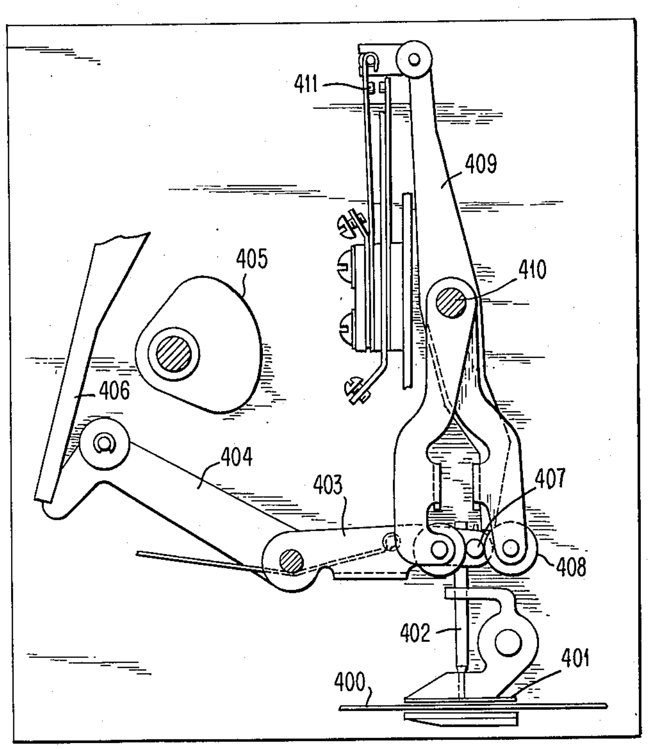
Figure 4H:
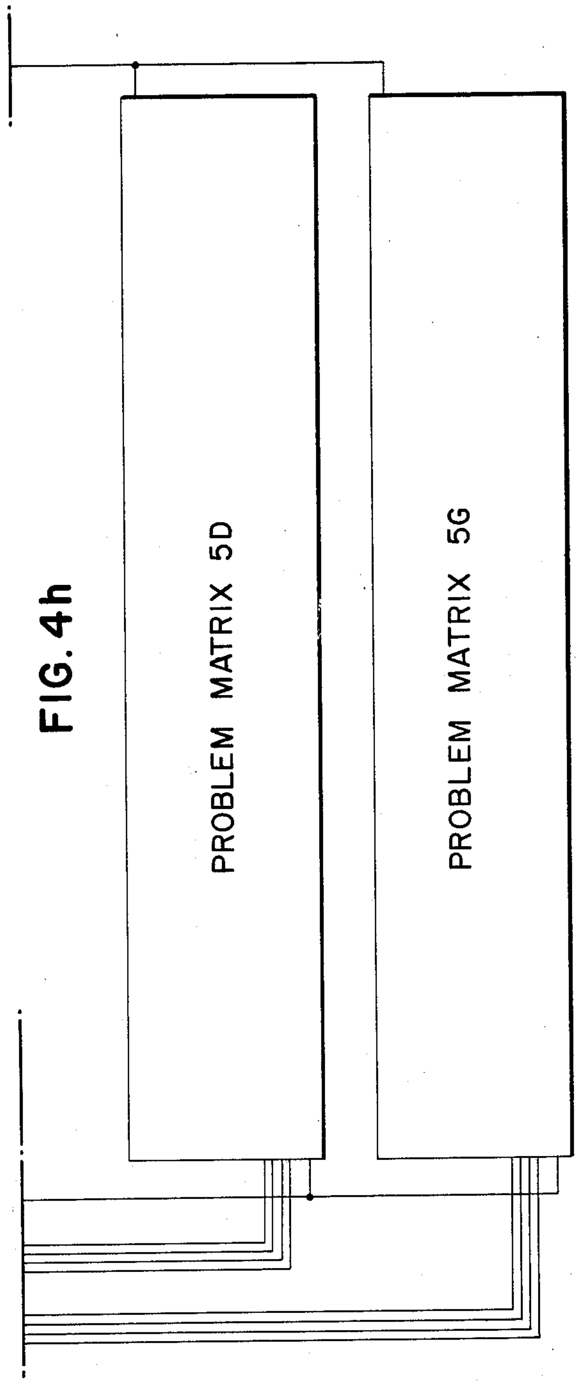

FIG. 6 is a sketch of a reading element of the memory tape of FIG. 5.

Figure 7:
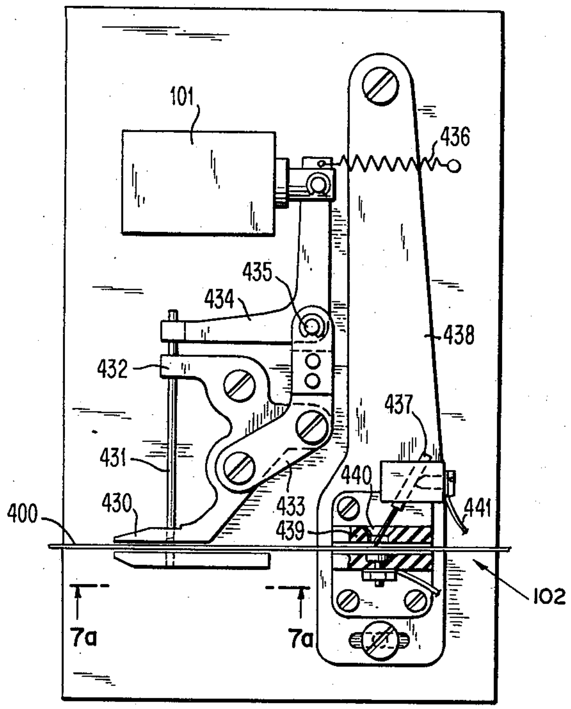

FIG. 7 is a sketch of an element capable of punching a hole in the tape of FIG. 5.

Figure 7A:
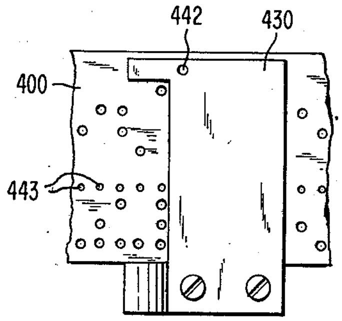

FIG. 7*a* is a bottom view of the punching element of FIG. 7.

In accordance with the invention, a memory unit for the subject matter of the program is provided having both random and sequential access capabilities. A machine to operator communication unit is provided capable of setting forth, under control, an increment of information, generally a question or a problem and related information which generally is the correct answer to the problem. The machine to operator communication unit is also equipped to convey the fact either that the answer was correct, incorrect, or that a time allotted for the particular response has expired. The machine to operator communication element may, in accordance with the invention be a visual display or any other sensory conveyance such as an aural transmission. An operator to machine communication device is provided on which the student or operator can actually construct his answer. This element preferably will be a manual communicating element such as a keyboard or handwritten character analyzer. It is important that the operator to machine communicating element be capable of conveying a constructed independent thought in contrast to a selection of one of a plurality of presented thoughts. The performance of the operator or student is monitored and evaluated by the correctness of the answers and the frequency of time intervention in response. The order of presentation of the material is modified by the evaluation of the performance. A prompter is employed to control mental blocks which may occur or as a result of inattention on the part of the student. Through the prompting feature, a time is given for an answer, after which the correct answer is displayed and the intervention of the timer is recorded. The interelement operation of a preferred embodiment of the invention is such that the program sequentially presents the increments of knowledge of a display unit. The student actively constructs his answer at an input keyboard within the length of time governed by the prompter timing element. Where the constructed answer is correct, this fact is conveyed by a correct answer light and the program is moved to the next increment of information. Where the constructed answer is incorrect, the fact is conveyed by the incorrect answer light; the fact that an incorrect answer has been made is recorded; and, the correct answer is displayed. Where the prompter timer indicates a sufficient time elapsed before the student constructs an answer, the fact is conveyed by the time-up light and the correct answer is displayed. As each answer is constructed in response to the incremental facts set forth by the program, a record is kept of the response correctness, incorrectness or the fact that prompting was required and this record is employed to govern the random selection of certain of the facts or problems set forth in the program, and the amount of influence given to particular information and the element time in the learning process.

The above described arrangement of apparatus features operate to give the maximum intercommunication between the programmer and the student and further operates to give greater flexibility to the programmer to set down a program for a more efficient learning process for a wider range of individual students, permitting the student to use the parts of the program which permit him, as an individual, to assimilate the subject matter best. It will be apparent that this device treats each student as an individual and that two students will receive a different order of subject matter from the same program, according to their respective capabilities of understanding.

The science of education has established, thus far in its development, the existence of at least seven principles of learning which have been found to have an interdependent marked influence on the rate of reception of the subject matter by the individual engaged in the learning process. These principles may be paraphrased as; permitting the progress of the individual to govern the quantity and complexity of the increments of subject matter presented; keeping the individual appraised of his progress during the learning process; engaging the student in active participation in the learning process; and, to provide for progress when a mental block has occurred. These principles are described in the following discussion in connectoin with the features of this invention that permit their utilization and the discussion is set forth in terms of a preferred embodiment using a visual display from machine to student and a manual keyboard communication from student to machine, although it will be apparent to one skilled in the art that the principles set forth may be realized with structures drawn from the whole technology of information processing.

*Principle of Learning I.—Immediate Reward (Knowledge of Results)*

One of the most important principles of learning is that the sooner the student learns whether or not he has set up the correct response, the faster will his learning progress. Although there is a great deal of theoretical controversy in the art over the definition and necessity of reward as opposed to temporal contiguity in subject matter presentation, there is complete agreement that the less time spent between the construction of the correct answer and the knowledge of results, the more efficient will be the learning. Unfortunately, in most test situations in the art as presently developed, there is no attempt made to accelerate the tedious delay between test and scoring. With the device of this invention, the student would have immediate knowledge of results since a correct response will automatically advance the program to the next knowledge increment indicating with a visual signal that the displayed response is correct. Not only is the qualitative correctness signal given, but there is also displayed before the student, the results of his construction. If an incorrect answer is given, the "wrong" light conveys this fact, the student has immediate knowledge of his error, and the correct answer is displayed.

*Principle of Learning II.—Active Construction*

With the control panel type of device, the student must actively construct his answer. In other words, his answer is an expression of an independent thought. There is no simple recognition of a correct answer among a limited number of presented alternatives, but rather, the student must produce the correct response from a large store of potential responses. The answer will be free of suggestion from the presented material so that each answer is a true evaluation of absorbed knowledge. This feature avoids process of elimination type reasoning and permits this device to be useful in the field of machine scoring.

*Principle of Learning III.—Modified Self-Pacing and the "Prompter"*

The art has indicated that a major problem upon which the whole concept of the teaching machine is based is that there is non-homogeneity of the student population of most classrooms. The student who uses the device of this invention will be able to go as fast as his abilities will allow him. No longer will the gifted be retarded by the slow and the slow frustrated by the gifted. With the capabilities set forth in this invention, the duration of; for example, elementary education would not be categorized by the completion of a specific number of years, but rather by the completion of a specific content matter.

Self-pacing generally in the art is accomplished by the successful completion of a problem automatically bringing the next increment of information into position for display. However, in accordance with this invention, two modifications upon this pure self-pacing procedure are provided. First, the element time is made available to the programmer. There should be a maximum amount of time which is to be allowed for the completion of any problem. At the end of this period of time, which should be adjustable at the discretion of the programmer, the second modification in the form of an option should be given the programmer of having the answer to the problem displayed to the student. This prompter operation has been demonstrated in the art to be an effective means of learning verbal and numeric information, such as arithmetc.

*Principle of Learning IV.—Adjusted List*

For rapid progress and to retain interest on the part of the student, the material that has been learned should not be included in all of the future learning trials. In accordance with the invention, this feature is provided by keeping a score of the responses and dependent upon the score, varying both the complexity of increments of knowledge presented and the frequency of presentation of new increments along with reinforcement of knowledge with already learned increments. In other words, a high score of correct responses would address more difficult increments and a score of incorrect responses or a score indicating that the prompter was frequently involved would address a certain number of learned increments before adding a new increment and indicate a reduction in rate of progress. In an actual embodiment of this invention for the teaching of arithmetic which will be described in detail later, the adjusted list feature is realized by addressing individual questions. The correctly answered questions are merely dropped from the future cycles of the memory. Thus, after the correct solution of a given problem, the student would have no further experiences with it until testing. In testing, the machine would merely override the score control and the entire list would be presented serially to the student. Where a number of promptings occur in succession, the score control is overriden and the material is presented serially.

*Principle of Learning V.—Repetition*

Since one of the most important determinants of a learning process is the number of experiences that a student has had with a given problem, some provision must be made for repeating problems. This could be done by a careful editing of the program and re-programming each time the student has a learning session; this, however, has limitations in that it may be inefficient. In accordance with the invention, a continuous program is employed and, by indicating the correctly answered increments of knowledge with a score, the list is reduced as the material is assimilated. This way the student will continue to be presented with only those problems he has not yet answered correctly, until he has reduced the list by a criterion which, for example, may be one correct answer per problem. In testing, the device of this invention through the use of a switch, keeps a score for the correct answers for one complete cycle through the program. In the testing, either the instruction or a testing program could be used as an examination of the progress of the student.

The next class of variables are those which can be manipulated through the construction of the program. These factors are of the utmost flexibility in both a machine and pedagogic sense and may be modified from time to time as new research shows that a particular sequence of activity is to be considered more efficient than that currently being used. These factors or principles include:

*Principle of Learning VI.—Meaningfulness Through Patterned Sequence*

Meaningfulness of the material to be learned is the most significant variable in the acquisition of new knowledge. For numerical symbols, meaningfulness is achieved through careful planning of the sequence in which the problems are presented. A number of variables may be arranged for in this fashion. Most obviously, simple problems should be encountered before the more difficult. On a slightly more complex level, the understanding of the process of addition is fundamental to the understanding of the process of multiplication and therefore mastery of the concepts of addition are required before problems of multiplication are introduced. With the capabilities at the disposal of the programmer through the principles set forth in this invention, it will be apparent that patterned sequences may be employed in the program or made up out of a sequential program by random addressing through the direction of the score as the work progresses. It will be apparent to one skilled in the art that through this invention decisions on presentation approaches may be made by the programmer and put into service as experience in the social sciences indicates that they may be of advantage.

*Principle of Learning VII.—Massed vs. Distributed Practice*

Provision should be made in the learning process for skipping increments of knowledge entirely, so that a rest period can be provided. The results of many experiments show that distributed practice (practice in which rest periods are interpolated) maximize, for many classes of material, the acquisition of new knowledge. The interpolation of rest intervals should be a function of the program since the optimum ratio of rest and practice will vary from time to time, from one subject matter to another, and from one student to another. Wiht the time limit controls available in accordance with the principles of this invention, a blank area in the program medium such as a tape, or, a clock governed by the score, would accomplish this rest interval effectively. A series of prompter interventions can be employed as an indication of the desirability of a rest period. One of the principal advantages imparted by the principles of this invention is the flexibility available to the programmer for many additions since a great deal of research is currently underway to determine the patterns which make the learning process progress most efficiently. Changes in these patterns would require reprogramming but would not require the mechanical re-design of the educational device. Any device which does not have such a flexibility would be expected to have a short life-time, for new developments would shortly render it obsolete.

What has been described thus far is an improved educational device embodying a number of apparatus features, which in cooperation impart to a programmer, flexibility and capability to embody into the learning process, using the apparatus of this invention, various principles of learning evolved from experience in the social sciences and the possibility of the embodiment of further principles as they are developed.

It will be apparent to one skilled in the art that a wide variety of structure elements currently in use in the information processing art and capable of achieving the functions set forth in the principles of the invention will be useable within the spirit of this invention. For example, the memory may be of any type having both random and sequential access and having sufficient capability to permit the programmer to enter the various increments of information so that they may be called up in the pattern desired or indicated to be desirable by a principle of learning, as we have described above. Thus, memories such as magnetic drums or tapes, display units such as cathode ray tube scanning; and, input devices involving character recognition may be employed.

Further, it will also be apparent that within the scope of the principles of the invention, that the presentation of material from the program may involve a series of facts to which no immediate answer is essential; each fact being called up by the advance control operated by the student and moved on by the prompter timer so that a question may be based on a series of facts where the programmer desires to present the material in this manner.

The principles of the invention are described in terms of a simple memory element and single student input element and machine student communication element although it will be apparent that each of these elements is laterally extendable to as many units in parallel as practical considerations will permit. In other words, for example, a single memory feeding a plurality of student instruction consoles.

In order to aid in understanding the principles set forth in this invention and to provide a starting place for one skilled in the art in the practice of these principles, a detailed apparatus for the teaching of the subject arithmetic is provided wherein a memory is a punched paper tape, well-known in the art, which has increments of knowledge in the form of problems punched therein at individual locations, the individual locations are serially positioned at a reading station and through the addressing of particular locations on the tape by means of a punch in one channel, particular memory locations are given special handling, such as reading or elimination based on performance by the student undergoing the learning process. A visual display element is provided as a first means of communication from the apparatus to the student or operator. A keyboard is provided as a second means of communication serving as an input device from the student or operator to the device. A buffer storage is employed in the device to make available both the problem and the answer which are read from the memory location. When an answer is entered into the device through the keyboard, it is compared in the buffer storage, with the answer read from the memory, and communication is provided to the student or operator indicating the correctness or incorrectness of the answer. A prompting feature is provided in which the time of presentation of the problem is governed and the fact that the time is up is communicated to the student or operator along with the presentation of the correct answer on the display element. Counters are provided to record the number of correct answers and the number of promptings that have occurred, and the order of the subject matter presented is adjusted by punching addressing information into the tape when a correct answer is made and using this addressing information to skip that problem as the various problems are presented to the student or operator.

Figure 1:
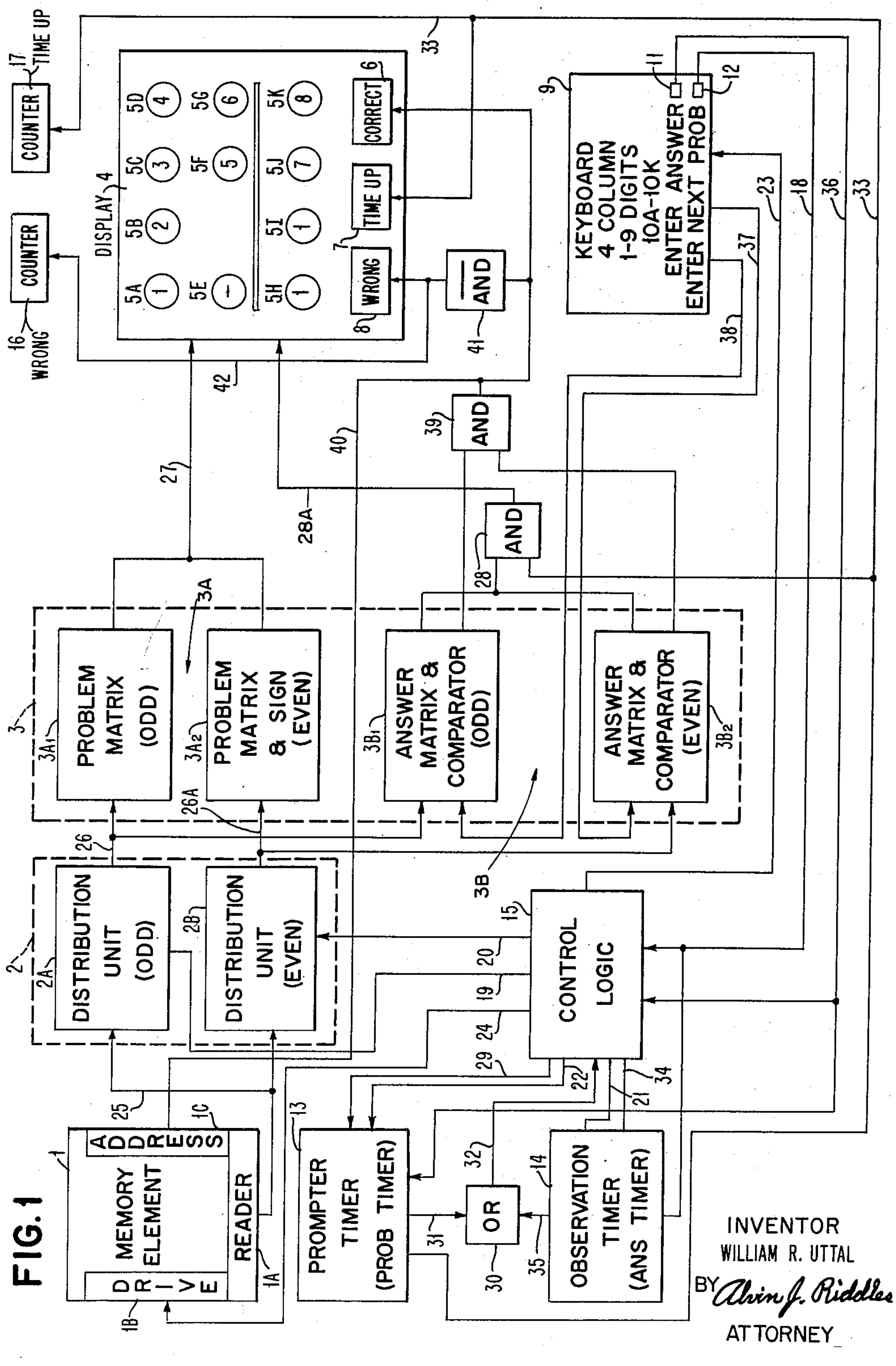
FIG. 1 is a functional block diagram illustrating the principles of the invention.

Referring now to FIG. 1, a functional block diagram is provided of the educational device of this invention. In FIG. 1, a memory element 1 is provided having a plurality of memory locations that may be presented either randomly or sequentially. The memory element 1 is equipped with a reading station 1A and a drive element 1B, which operates to position a particular memory location in reading engagement with the reading station 1A. The memory element also contains an addressing feature 1C which under the control of the responses by the student or operator serves to address certain memory locations for special treatment in presentation of the subject matter. The memory element employs a punched paper tape having eight channels of information and a ninth channel is employed for addressing particular memory locations. The details of the tape code will be described in connection with FIG. 5 to follow.

Returning again to FIG. 1, there is provided a signal converting element 2 encompassed by a dotted line. The element 2 is employed to make the particular code and/or storage medium of the memory element compatible with the remainder of the device, in this case with the buffer storage 3. Where the code and/or the storage medium of the memory element 1 is directly compatible, it will be apparent that the conversion element may be eliminated. For conversion of the code of the nine channel punched tape, the element 2 is shown as two units 2A and 2B handling odd and even numbers to be later described. The buffer storage 3 retains the increment of information and the response thereto available for use and comparison during intercommunication with the student. The storage element is shown dotted as element 3 and is made up of a problem matrix 3A and an answer matrix 3B, each of these in turn is made up of odd and even matrices for the handling of the particular memory code employed. The problem matrices are labelled $3A_1$ for odd numbers and $3A_2$ for even numbers. Similarly, the answer matrices are labelled $3B_1$ for odd numbers and $3B_2$ for even numbers.

A display unit 4 is employed for visual communication with the student or operator. The element 4 includes eleven lights 5A through 5K, each capable of indicating numerical or sign information. The lights 5A through 5K are arranged in arithmetic problem form with a sign light as will be later described. Further communication with the student or operator is provided on the display unit 4 by a correct answering indicating light 6, a prompting light 7 and an incorrect answer indicating light 8. A keyboard 9 is provided for communication between the student and the apparatus so that the student can actively construct his answer and the keyboard is provided with individual digit keys 10A through 10K for entry of the problem. The keyboard has mechanically locking manually resetting and electrically resetting keys so that the student can set up a response and manually change it if he changes his mind. The keyboard will be electrically reset on the machine cycle. A timing element 13 governing the time of presentation of an answer before prompting is provided and the device is equipped with an observation timer 14 which governs the time of display of the correct answer after prompting. A control logic element 15 is provided to arrange the order of events such as appropriate resetting in the advance to the next problem, the response to control by the timers. Counters 16 and 17 count, respectively, the number of wrong responses and the number of times prompting was required.

OPERATION

The student or operator at the keyboard 9 signifies readiness by pressing the key 12, which calls for the problem. This key is connected to the control logic 15 through a cable 18. The control logic 15 operates to perform the following functions. It resets the signal converter 2 via cables 19 and 20 and then the buffer storage through the signal converter via cables 26 and 26A; it resets the observation timer 14 through cable 21; and the prompter 13 through cable 22; it resets the keyboard through cable 23 and through cable 24 it signals the drive element 1B in memory element 1 to position the next problem under the reading element 1A. Normally, in the absence of a special address controlling position, the next sequential problem in the memory is presented. Readiness having been signified, the problem and its answer are read from the memory location by the reading element 1A and the information is conveyed by cable 25 to units 2A and 2B in the signal conversion unit 2; wherein, the code employed or the type of storage employed in the memory element 1 is rendered compatible for use. The information is then conveyed by cables 26 and 26A to the buffer storage element 3 wherein it is set up and made available in the problem matrices $3A_1$ and $3A_2$ and the answer matrices $3B_1$ and $3B_2$. The information from the problem matrices is conveyed by a cable 27 to the display unit 4 wherein it is communicated visually to the student by lighting the various lights 5A through 5K of the display unit. Simultaneously, the answer is set up in the answer matrices $3B_1$ and $3B_2$ for use and comparison. The answer matrices $3B_1$ and $3B_2$ are connected through AND circuit 28 under control of the prompter 13 through cable 28A to the display unit 4.

When a problem is displayed in the display unit 4, the control logic 15 through cable 29 turns on the prompter timer 13 which, if no response is received through the keyboard 9 during the time of running of the timer, delivers a signal to OR circuit 30 through cable 31 and the OR circuit 30 in turn delivers a signal to the control logic 15 through cable 32 to reset the keyboard again through cable 23. The prompter timer 13 also delivers a signal to the display unit 4 and AND circuit 28 through the cable 33 which turns on the time-up light 7, conditions AND circuit 28 to display the correct answer and indicates prompting in the counter 17. The control logic 15 also starts the observation timer 14 via cable 34. The observation timer controls the display of the correct answer for a given period and then a signal is delivered via cable 35 to OR circuit 30 which instructs the control logic 15 to advance to the next problem via cable 24 and to perform appropriate reset operations.

With a problem displayed in the display unit 4 and the prompter timer 13 not having run the allotted time; the student or operator then constructs an answer on the keyboard 9 by pressing an appropriate combination of keys 10, the enter answer key 11 is then depressed, and, via cable 36 the control logic is instructed to reset and to advance to the next problem and the prompter timer 13 is turned off. The answer itself is entered from the keyboard 9 into the answer matrices $3B_1$ and $3B_2$ via cables 37 and 38 and compared with the answer read from the memory 1. When the answers agree, a signal from answer matrices $3B_1$ and $3B_2$ conditions AND circuit 39 to light the correct answer light 6 via cable 40. Cable 40 also delivers information to the addressing section 1C of the memory element 1 to alter the order of presentation of material from the memory by addressing. Where the AND circuit 39 does not deliver a signal, NOT AND circuit 41 delivers a signal which turns on the wrong answer light 8 and through a cable 42 causes the incorrect answer to be added in counter 16.

It will be apparent to one skilled in the art that the NOT compare signal may also be employed for more involved addressing procedures in the element 1C.

What has been described in connection with FIG. 1 is the logical interaction of an apparatus embodying the principles of this invention, wherein as a result of the intercooperation of the elements as the learning process is undertaken, all of the presently evolved principles of learning are employed and sufficient flexibility is provided in the elements of the apparatus to allow for the application of future principles of learning as they are established through the social sciences and to allow for the giving of particular emphasis to individual principles of learning over others.

As may be seen from the above description, the immediate reward principle of learning I, earlier discussed, is provided by the lamps 6 and 8 in the display unit 4, which serves to give the knowledge of the results of the answer entered through the keyboard 9 to the student or operator as soon as he has made his decision and entered it. The use of these lights for the reward is based on the fairly well established belief that for human beings the satisfaction of the knowledge that an answer was correct serves as an adequate reward.

Active construction of the answer by the student, which is principle of learning II, earlier discussed, is provided by the keyboard 9 on which the student or operator actually formulates a response. It has been the practice in the art to provide the answer by selecting one of a narrow number of alternatives but it has been found that progress is more rapid where the response is constructed from an independent thought rather than selected.

The prompting feature, which is principle of learning III, is provided through the prompting timer 13 which turns on lamp 7 and arranges the presentation of the correct answer when too much time has elapsed between the presentation of a question by the display unit 4 and the receipt of an answer through the keyboard 9. This permits modification of self-pacing in that it places a restriction on the amount of time that can be taken per reply. Self-pacing is generally established by the automatic advancement of the next problem upon determination of a correct response to the previous problem.

The adjustment of the list of material that is presented to the student, which is principle of learning IV, earlier discussed, is accomplished by assigning a special addressing information bit to a particular increment of information and employing that address bit to reduce the associated increment of information from consideration in future efforts. Specifically, in FIG. 1, the correct compare signal via cable 40 operates to provide addressing information through element 1C at the location in the memory connected with the specific information. Specifically, a correct compare signal operates to punch a hole in a channel of the memory tape opposite the problem so that the problem will be skipped in the future. As a result of this adjusted list feature, it will be apparent that two parties having completely different mental capacities may, when undergoing the learning process, receive a completely different order of presentation of material and depending upon the quantity of material available in the program, each may also receive a completely different type of instruction. In other words, each may see a completely different order and also see completely different material, yet upon completion of the learning process, both will understand the overall body of knowledge contained in the program.

Repetition is accomplished through the random and sequential addressing aspect of the memory. This is principle of learning V, discussed above. It operates for reinforcement of the student where he has failed to correctly answer a problem. In the arithmetic teaching embodiment under discussion, repetition is accomplished through the skipping of the correctly answered problems and the automatic repeating of the problems that were missed, since the program tape of this embodiment cycles until a correct punch is attained for each problem presented.

The imparting of meaningfulness through patterned sequence, which is principle of learning VI, previously discussed, is accomplished through the addressing feature in element 1C of the memory which, in essence, assigns information to the particular subject matter which gives it the property that permits special handling in later processing. This assignment is made using signals derived from the performance monitoring equipment that records correctness of answers and the assignment is employed to adjust the sequence in which the problems are presented and to give emphasis to certain particular material and thereby to impart the meaningfulness of the material to the student.

Massed vs. distributed practice, which is principle of learning VII, previously discussed, is accomplished by the provision for skipping particular items entirely and by monitoring the occurrence of the requirement of prompting through counter 17 so that rest intervals may be achieved through reduced complexity.

In order to further assist one skilled in the art in comprehending and practicing the principles of the invention, a detailed description is provided in the following material of an actual embodiment of the educational device capable of teaching the subject arithmetic. This device is constructed along the lines of the logic discussed in connection with FIG. 1. This device is shown in perspective in FIG. 2 and the connections and features therein are described in detail in FIGS. 4*a* to FIG. 4*j*. The organizational layout of the detailed diagram shown in FIGS. 4*a* to 4*j* is shown in FIG. 3.

Figure 2:
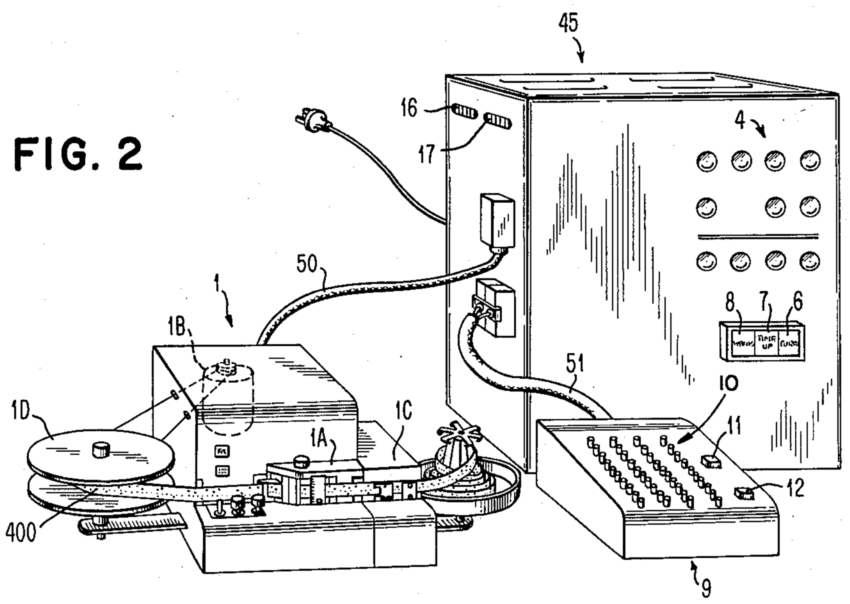
FIG. 2 is a perspective view of the educational device of the invention.
Figure 3:
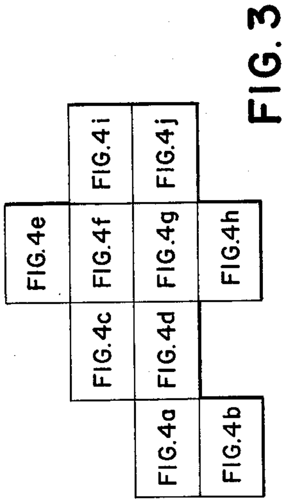
FIG. 3 is a plan of the assembly of a wiring diagram of the invention.

Referring next to FIG. 2, a perspective view is shown of the device described in connection with FIG. 1 and FIGS. 4*a*–4*j*. In FIG. 2, the memory element 1 is provided with a reading element 1A for reading a paper tape mounted on a reel 1D and driven by a drive element 1B, the memory element 1 is also equipped with an addressing punching station 1C. The information read from the memory 1 is conveyed to a console 45 via a cable 50 which also conveys addressing information from the console 45 to the punching station 1C. The reading station 1A of the memory element 1 is made up of a plurality of pin sensing devices, as will be described in connection with FIG. 6, which are capable of sensing the presence of holes in the tape and, in turn, closing electrical contacts which activate the circuitry as will be described in connection with FIG. 4*a*. The console 45 has on its face a display portion 4 made up of a plurality of lamps capable of conveying an arithmetical problem with instruction symbol and performance lamps 6, 7, and 8, for conveying correct, incorrect and time-up information. The console section 45 is also equipped with counters 16 and 17 which convey information concerning correctness of answers and the frequency of timing intervention. Keyboard 9 is provided to permit the student to construct an answer on keys 10. The keyboard 9 is also equipped with an enter answer key 11 and enter next problem key 12 and is coupled through cable 51 to the console section 45.

For purposes of explanation of the operations involved in the learning process and the manner these operations are accomplished in the preferred embodiment of FIGS. 1 and 4*a* to 4j, a composite diagram of the nine channel tape is next described. This diagram is shown in FIG. 5 together with an illustration of the code employed and several sample arithmetic problems.

Referring now to FIG. 5, in a first portion of the figure, labelled "A," the nine channel tape is shown. In a second portion of the figure, labelled "B," there is reproduced a layout corresponding to display unit 4 with the lamps 5A to 5K arranged to illustrate an arithmetic problem and instruction. Lamps 5A to 5D are positioned to accommodate a four significant figure operand. Lamps 5F and 5G are conventionally positioned to accommodate a two significant figure operator. Lamp 5E is positioned conventionally on the same line as the operator to signify the arithmetic instruction for the operator and lamps 5H through 5K are positioned below a permanent line to convey a four significant figure answer. In a third portion, labelled "C," an illustration of the code employed in the tape is shown. The nine channels of the tape in section A have been labelled "1" through "9," channels 1 through 4 are employed for odd numbered information and channels 5 through 8 are employed for even numbered information. The tape has been broken into memory locations comprising six address portions. These locations are shown separated by heavy lines, in FIG. 5, to facilitate following the description. The first address portion is used for information concerning the instruction sign appearing in lamp 5E for the problem to be presented in the display unit, 4. Information for the respective lamps 5A through 5G (excluding 5E) is entered in addresses 2, 3, 4, 5, and 6 with channels 1 through 4 for one lamp and 5 through 8 for another. Each group of channels is labelled with its respective lamp designation for clarity. The numerical information involved in a problem is entered in binary form; wherein the four individual channels per lamp, for example 1, 2, 3, and 4, are the powers of 2, namely $2^0$ for channel 1 signifying a 1; $2^1$ for channel 2 signifying a 2; $2^2$ for channel 3 signifying a 4; and, $2^3$ for channel 4 signifying an 8. As a specific example, a 6 for lamp 5A would involve a hole in channel 4 and a hole in channel 2.

The channel 9 is employed for addressing information to be punched into the tape upon experience with handling the subject matter of the program as the learning process takes place.

Referring again to FIG. 5, the code is shown in section C. This section illustrates the above described binary code for the numbers 1 to 10 which will appear in lamps 5A through 5D and 5F through 5K. A portion of section C describes a code for the lamp, 5E, which conveys the arithmetic instruction symbol for add, subtract, multiply, or divide.

The programmer in arranging the body of knowledge, arithmetic, presents the subject matter in increments in problem form as follows.

Holes in the tape are indicated by ⊗.

Referring to section B, as an example of a first problem, let us consider the case of 2+2 being equal to 4 wherein lamp 5D in the display element 4 of FIG. 1 is assigned the augend two by the punching of a hole in the tape in the information section assigned to lamp 5D in channel 6 which corresponds to $2^1$ or 2. The lamp designation numbers are indicated along the edge of the tape for ease in the following the description. Similarly, lamp 5G, positioned under lamp 5D in the display element 4, is assigned the addend 2 by a hole in the tape in the information section for lamp 5G in the $2^1$ position in channel 6. Since the instruction is +, addition; in accordance with the instruction code for lamp 5E in section C of FIG. 5, no information will be present in the first address position in channels 5 to 8 for lamp 5E. This results in a + appearing in lamp 5E. Since the answer to the problem now set up in lamps 5D and 5G is 4, this will be shown in lamp 5K as a 4 and is accomplished by punching the information into the tape in the $2^2$ position for lamp 5K which is address 6.

As has been previously described, when a student undergoing the learning process signals via key 13 or as a result of a correct answer that he is prepared for the next problem, the memory drive moves to the next memory location block of addresses. If a punch is present in channel 9, it indicates that the problem has been correctly answered and that problem is skipped. When an address block is located for a desired problem, the operation instruction add and the problem 2+2 is placed in the buffer storage matrices $3A_1$ and $3A_2$ and then conveyed to the display unit 4 and the answer 4 is set up in the answer matrices and comparators $3B_1$ and $3B_2$ for comparison with the constructed answer by the student. The constructed answer is formed by displacing the 4 key in the keyboard 9 and then displacing the enter answer key 11 within the time allotted by the prompter timer 13.

Moving to the next block of six addresses, and referring to section B of FIG. 5, as a second example problem we will subtract 5 from 10. The subtraction instruction in lamp 5E is accomplished with a hole punched in the information section of the tape for 5E in channel 5. Since 10 is the minuend, it will be entered in lamps 5C and 5D as a 1 and a 0, so that a 1 is punched in channel 1 for lamp 5C and a 0 or 10 is punched as an 8 and a 2 in channels 8 and 6, respectively, for lamp 5D, as indicated. The subtrahend, being a 5, is entered in lamp 5G by reading a punched 4 in channel 4 and a 1 of channel 5 for lamp 5G. The remainder, being a 5, is entered in lamp 5K through punches in channels 7 and 5 for a 4 and a 1 for lamp 5K, as indicated.

Multiplication is illustrated in the next block of six addresses. In accordance with the code in section C, lamp 5E is caused to indicate × through a punch in channel 6 for lamp 5E. As may be seen from section B, the problem 5×5 is entered in lamps 5D and 5G by sensing respectively a 4 and a 1 punched into the tape in channels 7 and 5 for the multiplier lamp 5D and multiplicand lamp 5G. The product of 25 is entered in lamps 5J and 5K through a punch in channel 2 for lamp 5J and a 5 which is a 4 in channel 7 and a 1 in channel 5 for lamp 5K.

Division is displayed in a similar manner to the other three basic arithmetical operations and referring to section B in the next block of six addresses, we see the problem divide 24 by 12 with the resulting answer 2. Since, as we have discussed, the division symbol for lamp 5E is punched and read in accordance with the code in section C by a hole in channels 5 and 6, as indicated. The divident 24 is entered in lamps 5C and 5D by a 2 in channel 2 and a 4 in channel 7. The divisor 12 is entered in lamps 5F and 5G as a 1 in channel 1 and a 2 in channel 6. The quotient is entered as a 2 in channel 6 for lamp 5K.

As has been previously discussed in each case the answer is retained in the answer matrix and is displayed to the student only if an incorrect answer is entered, or prompting takes place.

It will be apparent to one skilled in the art that sufficient lamps 5A through 5K have been provided for in the display element 4 for the handling of an answer to four decimal places involving the four basic instructions of arithmetic; and, within the spirit of the invention, it will be apparent to one skilled in the art that the extension to much higher decimal places and extension to more involved mathematical operations may be readily achieved through conventional techniques. Since the essence of the invention is directed to the provision of an organization of structure for the utilization of principles of learning involved in the learning process, it should therefore be understood that no limitation is to be construed by the particular structure illustrated.

Referring next to FIG. 3, there is a plan showing the arrangement of FIGS. 4*a* to 4*j* which is a schematic wiring diagram of a preferred embodiment achieving the functions of the invention along the lines illustrated in connection with FIG. 1.

Referring to FIGS. 1, 2 and 4*a* through 4*j*, a memory element 1 of FIG. 1 corresponds to the tape reader and control in FIG. 4*a* and the same numerical designation is given to corresponding elements for clarity of explanation. The drive element 1B of FIG. 1 is shown in FIG. 2 and advances the tape under the controls to be described. The reading apparatus 1A of FIG. 1 as shown in FIG. 4*a* is made up of a plurality of normally open contacts 100A through 100I which are closed by pins capable of sensing holes punched in the tape, as illustrated in FIG. 6. Each of the normally open contacts 100A through 100I is connected through contact 100, which is cam operated to a reference potential. The cam operation permits interruption except during machine reading cycles. The addressing feature 1C is provided through a punch solenoid 101 in FIG. 4*b*, which operates a punching mechanism shown in FIG. 7, and a reading station 102 in FIG. 4*b*, also shown in FIG. 7. Information in the form of holes in the tape illustrated in connection with FIG. 5 is read through the passing of pins through the holes in the tape, which close the contacts 100A through 100I and the sensed information is conveyed via cable 103 (FIG. 4*a*) to the distribution units corresponding to element 2 of FIG. 1.

Referring to FIGS. 4*c* and 4*d*, the distribution unit is divided into odd and even information and are made up of rotary stepping switches 104A through 104D and 105A through 105F each having a number of mechanically ganged wiping arms. Each stepping switch is equipped with an automatic resetting mechanism which returns the wiper to the start position when a specific point is reached. The stepping switches 104A through 104D and 105A through 105F and with their individual switching arms are connected through cables 106A through 106J which in turn connect individual points in the rotary stepping switches to relay pick-up coils in the problem and answer matrices shown on FIGS. 4*e* through 4*j*. These matrices correspond to the buffer storage 3 of FIG. 1.

Each of rotary stepping switches 104A through 104D and 105A through 105F has a wiper arm for each of the four significant figures capable of being displayed in the display element 4 of FIG. 1, and the wiper arms A and B of rotary stepping switches 105A and 105B are employed for resetting in connection with control logic shown in FIG. 4*b* and element 15 of FIG. 1.

Information sensed through the closing of contacts 100A to 100I in the tape recorder and control section is transmitted through the rotary stepping switches 104A through 104D and 105A through 105F and cables 106A through 106J set up in the problem and answer matrices. The problem matrices are illustrated in FIGS. 4*e*, 4*f*, 4*g*, and 4*h* for the lamps numbered 5A through 5G. The answer matrices are shown in FIGS. 4*i* and 4*j* for lamps 5H through 5K. In FIG. 4*f*, the instruction matrix for lamp 5E is made up of relays 110 and 111, each having a pick-up and a hold coil in accordance with the convention in the art, and being equipped to have the hold terminal connected to a reset lead for machine cycle resetting to be later described. The relay 110 has one transfer point and the relay 111 has two transfer points connected, as illustrated, in a path from ground through a multiple element display lamp in series with a current limiting impedance 112 to a source of potential shown in FIG. 4*e*.

The multiple element display tube may be one in which a plurality of illuminating designs appear on the face in accordance with signals applied thereto. One example of these tubes, which may be employed in the matrices of this invention, involves a plurality of translucent discs, each having a design engraved into the surface thereof and provision to selectively illuminate the edge of each disc so that the selected design will be visible through the other discs. With the numerals 0 through 9 each on a separate disc light applied through the edge of the disc from a separate signal serves to illuminate the particular number. In the case of the instructional matrix for lamp 5E, the discs would bear instead of numerals, the arithmetical instruction signs +; —; ×; and ÷.

Referring to FIG. 5 and to the problem matrix in FIG. 4*f*, when no information is present in the code section C for the lamp 5E there is a path from the positive source of potential through resistor 112, the + terminal of lamp 5E, the normally closed points of both relays 110 and 111 to reference potential so that lamp 5E will indicate + or add. Similar paths are present to indicate the respective signs for each of the other three code combinations shown in section C of FIG. 5.

The details of the problem matrix for lamp 5A and for lamp 5B are shown respectively in FIGS. 4*e* and 4*g* and the remaining problem matrices for lamps 5C, 5D, 5F, and 5G constructed identically and are shown schematically in FIGS. 4e to 4h as blocks.

Considering first the problem matrix for lamp 5A in FIG. 4e, four relays 121, 122, 123, and 124 are provided for the binary numbers, as provided in the code; wherein, relays 121–124 correspond respectively to numbers 1, 2, 4, and 8. Each relay has relay points so that a binary to decimal Christmas tree network is provided between a reference potential and the terminals of lamp 5A which, in turn, is connected to a source of positive potential through a current limiting impedance 125. The Christmas tree network is one conventional in the art for the conversion of binary to decimal digits. The binary representation in relays 121–124 results in a current path to the corresponding electrode of the lamp 5A so that considering for example, a 7 read through the points 100A through 100I in the element 1 of FIG. 4a conveyed through the distribution unit stepping switches 104 and 105 is conveyed via switch 104 through cable 106A to close relays 121, 122 and 123 in FIG. 4e setting up a 4, 2, and a 1 in the Christmas tree network which, in turn permits a path through the normally closed point of relay 124 to the transfer of the uppermost point of relay 123 to the transfer of the center point of relay 122 and through the transfer of the second point from the bottom of relay 121 to turn on the 7 in lamp 5A.

Similarly, the problem matrix for lamp 5B is made up of relays 130, 131, 132, and 133 for the numbers 1, 2, 4, and 8. Each relay having a pick-up and a hold coil with one terminal on each coil connected to a source of voltage and each relay having appropriate points for a binary to decimal Christmas tree network from reference potential through the terminals of lamp 5B and the current limiting impedance 135 to the source of potential shown in FIG. 4e. Thus, information read from the tape and conveyed through the distribution unit may be converted from the binary code to the decimal notation and displayed in the lamp 5B as previously described. Each of the matrices 5C, 5F, 5D and 5G are constructed in the same manner as those described for 5A and 5B and together permit setting forth in element 4 the mathematical operand in lamps 5A–5D, the mathematical instruction in lamp 5E, and the mathematical operator in lamps 5F and 5G. The ansewer matrices 5F, 5J, 5I and 5K are shown in FIGS. 4i and 4j. Each answer matrix is set up employing four relays with points forming a binary to decimal Christmas tree network, as described in connection with the problem matrices. The points of the network are connected to the decimal electrodes of one of the answer display elements. The common return of the Christmas tree network is connected to reference potential through the normally open points 284 of an answer relay 252, to be later described, so that an answer is displayed only when there is an incorrect answer. The prompting feature also activates the incorrect answer relay. The connections from the Christmas tree network to the terminals of the display element are also connected to a plurality of contacts on the individual keys 10 of the keyboard 9 and a common line from the keys to the coil on the comparator relay 146 so that in the event that the answer set up in the matrices is not compared with the information set up in the keyboard the answer is entered in the lamps 5H through 5K. Specifically, referring to answer matrix 5H in FIG. 4i, four relays 140, 141, 142, and 143 for the numbers 1, 2, 4 and 8, are fed from the stepping switches 104A–104D through cable 106D. Each relay has a conventional pick-up and hold coil with both coils connected to a source of potential and each has appropriate points for the binary to decimal Christmas tree network providing a path from reference potential to the normally open points 284 of the answer relay 252, the terminals of lamp 5H and, in turn, through current limiting impedance 145 to a source of potential shown in FIG. 4e. The connections to the individual electrodes of the lamp 5H are brought out to the contacts of the keys, numbered 0 through 9, of the particular column of the keyboard 9. In the case of lamp 5H, this column is the thousandths, or fourth decimal place position. The depressing of the keys serves to provide a current path from the Christmas tree network through the contacts of the keys to relay 146 which is one of series group of comparator relays 146, 147, 148 and 149 for each lamp of the answer, each having one terminal connected to the source of potential and each having a single normally open point providing, when closed, a series current path for each of the four decimal places of the keyboard to pick-up the answer relay 253 and to light the correct answer lamp 6 in the display element 4 and to advance the memory element to the next problem. Where there is no comparison between the information set up on the keyboard and that set up in the answer Christmas tree network, the answer relay 253, to be later described, permits the correct answer to be indicated on the face of the lamps 5H through 5K. Diodes 150A, 150B, 150C, and 150D and resistors 151A and 151B are provided to prevent a back circuit causing after-glow in the display tubes due to the differences in return voltages required for the relays and tubes.

The answer matrix 5I is constructed similarly to the answer matrix 5H and is made up of relays 160, 161, 162 and 163 each having a conventional pick-up and hold coil having the terminals connected to sources of potential and each having sufficient points for a binary to decimal Christmas tree network connected to the electrodes of lamp 5I, which in turn is connected to the source of potential through a current limiting impedance 165 and the signals applied to the electrodes of the lamp are capable of being diverted by the manual closing of switches from the keyboard 9, shown as a block diagram in this matrix. Reset solenoids 171, 172, 173 and 174 are shown for each matrix, each solenoid having one terminal connected to a source of potential and having the one terminal connected to the reset position of stepping switch 105B in FIG. 4d. These solenoids return the keys of the keyboard to the reset position electrically when the answer is entered and the machine is reset.

Referring next to FIG. 4a, the prompter and the observation timers are illustrated. The prompter timer 13 of FIG. 1 employs a timing element which may be a standard A.C. clock device 180 having a set of normally open points 181, power for the timer 180 is shown schematically as 110 volts and the power to the clock is interrupted through a set of normally open points 182 on relay 183. The relay 183 also has a second set of normally open contacts 184 which are connected to the control logic position, labelled "M," of rotary stepping switch 208B. The function of the lettered control logic operations will be later described. The points 181 of the timer 180 are connected to the coil of relay 210. The relay 210 has two sets of normally open and one set of normally closed contacts 211, 212, and 213, respectively. The prompter timer is also equipped with a relay 215 to a source of potential and having the other terminal of the coil connected to the normally open points 211 of relay 210. The relay 215 has a set of normally open contacts 216, a set of normally closed contacts 217 and a set of transfer contacts 218. Each of relays 183, 210 and 215 has a pick-up coil only. The manual key 220 is provided corresponding to the enter answer key 11 of FIG. 1. The key 220 is connected into the problem timer circuitry to stop the running of the problem timer 180 by picking up relay 215 which through the opening of its normally closed points 217 drops out relay 183 which through the opening of its points 182 interrupts the power to the timer.

The observation timer is made up of a timing element 225, such as an A.C. clock having a normally open set of contacts 226. Power for the element 225 is interrupted through a set of normally open contacts 227 on relay 228. Relay 228 has a second set of normally open contacts 229. The observation timer is also equipped with a relay 230 having two sets of contacts, normally open contacts 231 and normally closed contacts 232; with relay 233 having a set of normally open contacts 234, a set of normally closed contacts 235 and a set of transfer contacts 236; and with relay 237 having two sets of normally closed contacts 238 and 239. A manual switch 240 corresponding to the enter the next problem key 12 in FIG. 1 operates to turn off the observation timer 225 by picking up relay 233 which through its normally closed points 235 drops out relay 228 which in turn through its points 227 interrupts current to the timer 225. In the control logic section, FIG. 4*b*, element 15 of FIG. 1 rotary stepping switches with wipers 200A through 200D and stepping switch 260 are provided each capable of electrical resetting. Switch 200 is reset from its point 15 and switch 260 is independently reset as will be described. The switch 200 having wipers 200A through 200D is actuated through relay 241 having a set of normally open contacts 242. The switch 200 with wipers 200A through 200D program the various operational interlock operations which bear letter designations.

In the control logic section, FIG. 4*b*, an incorrect answer counter 16 and a time-up counter 17 are provided shown conventionally connected to 110 A.C. Incorrect answer lamp 8, correct answer lamp 6 and time-up lamp 7 are provided along with relays 250, 251, 252, 253, 256, and 257. Relays 250 and 251 are employed in the addressing operations. Relays 252 and 253 are employed in the answer entering operations and relays 256 and 257 involve prompting and resetting respectively. The rotary stepping switch 260 is provided to keep track of the number of times in succession that the prompter timer has controlled the operation of the machine and to on the condition of five successive promptings override the effect of the correct answer punches in column 9 of the tape. This is accomplished through relay 251 which through its normally open points 325 is held up until manually reset by the instructor through key 326. Through normally closed points 327 of relay 251 the reading of punches in the 9 column of the tape by reading station 102 is interrupted. The reading of the punches in the 9 column is also manually interrupted through key 328 which is used by the instructor for testing. The relay 251 through its points 324 is reset by relay 253 through its points 329 when an answer is entered and relay 251 through its normally closed points 235 conditions the advance of the stepping switch 260 when prompting takes place and relay 256 is picked up and the points 330 are closed.

Referring to stepping switches 200A through 200D, each stepping switch is equipped with fifteen positions appropriately connected to lettered operational control lines. The fifteenth position of each branch of the stepping switch is labelled "Reset" and operates to return the wiper to the home position labelled "O." The home position of switch 200A is labelled "S" and operates either in the presence of the enter next problem manual switch 240 (FIG. 4*a*) through the normally open points 275 of relay 250 to deliver control S which picks up relay 233 in the observation timer, stops the timer, as previously described, and delivers a signal from condenser 276 and resistor 277 combination through the transfer points 236 to the Z control line which picks up relay 241 and through its normally open points 242 advances the stepping switches to the 1 position. In the 1 position, stepping switch 200A delivers the P control signal which picks up relay 257. This relay operates to reset the machine through its three normally closed contacts 280, 281, and 282. Contacts 281 and 282 reset the problem and answer matrices by dropping out the hold coils of the information relays therein. Contact 280 drops out the hold coil and resets relays 252 and 256. Relay 252 is picked up with control signal 6 after the answer light is entered and through its points 283 lights the answer lamps 6 and 8 conditioned by the transfer points 338 of the relay 253. Relay 252 through points 284 completes the circuit to reference for the Christmas tree networks of the answer matrices 5H to 5K. The points 285 of relay 252 imposes the condition that the other logical operations be completed before the information is entered in the answer counter.

Referring next to the stepping switches 200 with mechanically ganged wipers A through D, each of these switches moves ahead one step each time the tape reader does not perform this function. This is accomplished through the control function labelled "Z" connected to stepping switch 200B and to sensing points 100A of the tape reader and control. The control Z activates relay 241 and through its points 242 moves the coil of the stepping switch one step. The functions control X on stepping switch 200C and Y on stepping switch 200D operate to step the distribution unit stepping switches in FIGS. 4*c* and 4*d* ahead each time. The function control M at position 8 of stepping switch 200B operates to start the problem or prompter timer 180 in FIG. 4*a* by picking up relay 183, the operation of which has been previously discussed in connection with the prompter timer.

The control function N at point 13 of stepping switch 200B operates to start the observation timer in FIG. 4*a* by picking up relay 228, the operation of which has been previously described in connection with the observation timer. The control function T connected to point 9 of stepping switch 200B operates to interlock the enter answer key 11 in FIG. 1 so that it can not be activated except at the proper time. This is accomplished by permitting the enter answer key 220 in FIG. 4*a* corresponding to key 11 in FIG. 1 to pick-up relay 215 which through the opening of its normally closed points 217 drops out relay 183 and shuts off the prompter timer 180. The transfer points 218 of relay 215 provide power from capacitor 340 and resistor 339 combination to the Z control function to step the logic stepping switch one step.

The control G function at position 14 of stepping switch 200B controls the scoring of responses at the end of the problem. This is accomplished by picking up relay 252 which is held up through points 280 on reset relay 257 and through the closing of its points 283, 284 and 285 operates to light the correct and incorrect lamps 6 and 8 and to gate the entry of information in the counters 16 and 17. The control function P is connected to the one position of stepping switch 200A. This function resets the entire system by picking up reset relay 257 which through the openings of its normally closed points 280, 281 and 282, as previously described, provides the resetting operation. The control function H connected to points 3 and 10 of stepping switch 200A operates to pick-up relay 237 which in turn resets relays 233 or 215, depending on which is up, through the opening of its normally closed points 238 and 239. The control function F on stepping switch 200A operates to activate the control magnet 300 in FIG. 4*a*, which during the portion of the cycle controlled by cam 301 operates to permit the contacts to read the tape. Relay 256 which is picked up by the prompter timer performs the following additional functions. It turns on lamp 7 through the closing of its points 332; it prevents the answer relay 253 from being picked up through its points 331 and it enters prompting activity information in counter 17 through its points 333.

Relay 250 which is picked up by relay 251 as previously described and which is held up through cam contact 341 during the time the problem is being handled, controls the disabling of the S and T control functions through its points 275 and 336 and interrupts the entry of information into the counters 16 and 17 through its points 337.

Relay 253 in addition to its previously described functions controls counting in counter 16 through its points 334 and actuates the punch solenoid 101 through its points 335.

With the above described combination of equipment and circuitry the tape is read address by address until the information in a problem location is set up for the learning process.

Referring next to FIG. 6, in FIG. 6 there is illustrated a schematic view of a sensing mechanism for the tape. The tape 400 is supported on both sides by a platen 401 having appropriate holes for a read pin 402. The sensing pin is lowered into a sensing portion by a spring loaded arm 403 coupled to a bell crank 404 which in turn has its movement disabled by a cam 405 acting on a bar 406. The spring loaded arm 403 in the reading position permits the read pin 402 by moving through the tape to permit the roller 408 to follow the stud 407 and since the pin contact lever 409 is being hinged at point 410 this operates to close the contacts 411 and to indicate the presence of a hole. Where a hole is not present, the pin prevents the lever 409 from coming back to the dotted position. The operation of the reading is under the control of the magnet 300 and cam 301 in FIG. 4*a*. The assembly of FIG. 6 is repeated for all nine channels of the tape in the reading station 1A.

Referring next to FIG. 7, the punching station 1C of FIGS. 1 and 2 will be described. The punching station is also equipped with a reading station for one channel. The power for the punching operation is provided by the punch magnet 101, the electrical circuitry of which is shown in FIG. 4*b*. In FIG. 7, the tape 400 is held in a platen 430 having a hole to accommodate a punch 431. The platen 430 has a punch alignment arm 432 which combined with the hole in the platen 430 serves to support the punch in two places. The platen is connected by a brace 433 to a bell crank 434 which is hinged at a point 435 to convert horizontal motion from the solenoid 101 to vertical motion of the punch 431. The solenoid is held in position to hold the punch 431 away from the tape by a spring 436.

The sensing of holes punched in the tape 400 by the addressing station 1C, in addition to the manner described in connection with FIG. 6, may also be sensed as shown in FIG. 7 by mounting a sensing brush 437 on an insulating bracket 438 having an insulating platen 439 supporting both sides of the tape 400. A hole 440 is provided through the platen 439 to accommodate the brush. Electrical connection is then made to the brush through a lead 441. This assembly corresponds to element 102 in FIG. 4*b*. The use of a separate reading assembly for the addressing feature permits addressing at memory locations other than adjacent the information itself, thus adding flexibility.

Referring next to FIG. 7*a*, which is a bottom view of the platen 430 and the tape 400; wherein, in this view, the hole 442 to accommodate the punch 431 is visible and the other channels of information in the tape are illustrated. The tape is moved by a series of small holes 443 which engage a sprocket in the reel 1D illustrated in FIG. 2.

The description of the tape movement, punching and reading has been schematically shown to illustrate the functions performed. The details of such tape handling equipment are available to one skilled in the art. As examples of detailed descriptions of such punched paper tape handling equipment involving a different number of tape channels but essentially the same principles, attention is directed to U.S. Patents 2,340,801 and 2,391,773.

What has been described is a logical arrangement of apparatus functions that permits one undergoing the learning process to progress at the most rapid rate consistent with his individual capabilities and at the same time provides flexibility to the learning process planner to employ future approaches to the communication of mental concepts as experience in the social sciences evolve them. The functions and cooperation of the apparatus in the learning process has been illustrated by a combination of electrical and mechanical equipment which can read arithmetic problems punched into a paper tape and convert them into information which can be conveyed visually to a student and can be compared with a response of the student constructed from an independent thought, all under the control of a fixed period of time. Equipment is provided also for the monitoring of the performance of the student through the number of times incorrect answers are given and the number of times the time element is entered into the learning process and through this monitoring performance to adjust the order of presentation of the subject matter.

While the invention has been particularly shown and described with reference to preferred embodiments thereof, it will be understood by those skilled in the art that various changes in form and details may be made therein without departing from the spirit and scope of the invention.

What is claimed is:

1. Educational apparatus comprising in combination memory means containing a plurality of memory locations, sensing means for reading the content of a particular memory location, said sensing means including positioning means to position a particular memory location in operable relationship with said sensing means, buffer storage means adapted to convey information from said sensing means to said buffer storage means, first communication means for transmitting information to an operator, means conveying information from said buffer storage to said first communication means, second communication means for transmitting information from said operator to said buffer storage, evaluation means responsive to said information transmitted from said second communication means for comparing said information from said operator with the information conveyed to said first communication means, third communication means informing said operator of the relationship of the information transmitted from said second communication means with the information conveyed to said first communication means, prompting means including timing means controlling the time between the communication of information conveyed to said first communication means and the receiving of information transmitted from said second communication means, said prompting means further including fourth communication means for conveying to said operator time information and for conveying further information to said operator through said first communication means, and memory positioning control means coupled to said memory positioning means and operable in response to information from said evaluation means to determine the positioning of specific memory locations for sensing.

2. The educational apparatus of claim 1 wherein said first, third and fourth communication means are visual and said second communication means is manual.

3. The educational apparatus of claim 1 wherein said first communication means is a visual display.

4. The educational apparatus of claim 1 wherein said first communication means is a display and said second communication means is a keyboard.

5. Apparatus comprising in combination a memory including a plurality of addressable locations containing a body of knowledge distributed in increments in said locations at least one of said locations containing an increment of knowledge in question form and a correct response thereto; buffer storage means capable of retaining the correct response to an increment of information in a particular memory location, first communication means capable of communicating the content of a memory location to a student, sensing means capable of transferring information from a memory location to each of said buffer storage means and said first communication means, said sensing means including memory positioning means capable of positioning in any sequence, any location of said memory in operable contact with said sensing means, second communication means capable of communicating a constructed response from a student to said buffer storage, comparison means comparing said student response with said correct response and generating a compare signal, response correctness indicating means responsive to said compare signal, timing control means for governing the time between the presentation of information through said first communication means and the receiving of a response through said second communication means, prompting means controlled by said timing means indicating the passage of a predetermined time and operable to communicate the correct response from said buffer storage to said first communication means and memory location positioning control operable to control said memory positioning means for positioning, in any sequence, any location of said memory in response to the frequency of responses and prompting.

6. The apparatus of claim 5 wherein said first communication means is visual and said second communication means is manual.

7. The apparatus of claim 5 wherein said first communication means is a display.

8. The apparatus of claim 5 wherein said second communication means is a keyboard.

9. The apparatus of claim 5 wherein said first communication means is a display and said second communication means is a keyboard.

10. A mental concept communicating device comprising in combination an evaluation station, a communication station, memory means retaining a plurality of sub-concepts capable in combination of conveying a particular mental concept, first selection means presenting each of a selectable order of said sub-concepts selected in any sequence from said memory means to said communication station, a response station, information transmitting means presenting at least one of quality and time characteristics of constructed response information pertaining to each said presented sub-concept from said response station to said evaluation station and second selection means coupled to said memory means and responsive to said evaluation station for modifying said selectable order of presentation of said sub-concepts to permit non-sequential selection thereof.

11. The communicating device of claim 10 wherein said communication station is a visual display and wherein said response station is a manually operated input device.

12. Education apparatus comprising in combination an information retaining memory including a plurality of discrete information locations, means for reading information present in a particular discrete information location, a first communication means conveying information from said memory to an operator, a second communication means conveying information from said operator to said apparatus, evaluation means comparing information that has been read from said memory and is related to the information communicated by said first communication means with information communicated through said second communication means, third communication means conveying evaluation information from said evaluation means to said operator, prompting means providing a time governed communication to said operator conveying an indication of the passing of a predetermined time between communication on said first communication means and communication on said second communication means, said prompting means including further means for communicating to said operator said information that has been read from said memory and is related to the information communicated by said first communication means, and information presentation order control means operable in response to said evaluation information and prompting information to control the order of reading of particular discrete information locations by said reading means to permit non-sequential order of reading thereof.

13. Educational apparatus comprising in combination an information retaining memory including a plurality of discrete information locations, means for reading information present in a particular discrete information location, a first communication means conveying information from said memory to an operator, a second communication means conveying information from said operator to said apparatus, evaluation means comparing information that has been read from said memory and is related to the information communicated by said first communication means with information communicated through said second communication means, third communication means conveying evaluation information from said evaluation means to said operator, and information presentation order control means operable in response to said evaluation information to control the order of reading of particular discrete information locations by said reading means to permit non-sequential order of reading thereof.

14. Educational apparatus comprising memory means containing a body of information disposed in question and answer form in a plurality of discrete memory locations, said memory means including means for positioning and reading in any order the content of particular discrete memory locations, means for communicating a question to an operator, means for communicating to said apparatus from an operator a constructed answer, prompting means for controlling the time allotted to construct an answer and for communicating the correct answer to the operator, means for determining the correctness of the answer, means indicating the correctness of the answer to the operator and means conditioned by the correctness of said answers for controlling the order of said discrete memory locations positioned and read by said positioning and reading means to permit non-sequential order of reading thereof.

15. Educational apparatus comprising an addressable memory, a display element, a keyboard, means conveying information from said memory to said display element, means comparing information at said keyboard with information from said memory, means indicating comparison information of said information from said memory with said information from said keyboard, means recording said comparison information, prompting means governing the time of information presentation, means indicating and recording activity of said prompting means, means conveying information from said memory to said display element conditioned by at least one of said comparison information and said prompting means and addressing means conditioned by at least one of said comparison recording means and said prompting recording means and operable to alter the order of presentation of information from said memory in a non-sequential manner.

16. Educational apparatus comprising memory means containing a body of information disposed in question and answer form in a plurality of discrete memory locations, said memory means including means for positioning and reading in any order the content of particular discrete memory locations, means for communicating a question to an operator, means for communicating to said apparatus from an operator a constructed answer, performance monitoring means including answer evaluating means for determining and communicating to the operator the correctness of the answer, and prompting means for controlling the time allotted to construct an answer and for communicating the correct answer to said operator and means for controlling the order of said discrete memory locations positioned and read by said positioning and reading means in non-sequential manner governed by the performance with the answers.

17. The educational apparatus of claim 16 wherein said question communicating means is visual and said answer communicating means is manual.

18. The educational apparatus of claim 16 wherein said question communicating means is a display.

19. The educational apparatus of claim 16 wherein said question communicating means is a display, wherein said answer communicating means is a keyboard and wherein said memory is a punched paper tape.

References Cited in the file of this patent

UNITED STATES PATENTS

| | | |
|---|---|---|
| 2,738,595 | John et al. | Mar. 20, 1956 |
| 2,826,828 | Hamilton | Mar. 18, 1958 |
| 2,835,052 | Raich et al. | May 20, 1958 |
| 2,877,568 | Besnard et al. | Mar. 17, 1959 |
| 2,953,859 | Fink | Sept. 27, 1960 |
| 2,984,017 | Pask | May 16, 1961 |